Jan. 11, 1955 I. L. GRIFFIN 2,698,983

CLOSED COVER FOR SLASHER SIZE BOXES

Filed Sept. 19, 1951 12 Sheets-Sheet 1

IRA L. GRIFFIN,
INVENTOR.

BY Eaton & Bell

ATTORNEYS.

Jan. 11, 1955 I. L. GRIFFIN 2,698,983

CLOSED COVER FOR SLASHER SIZE BOXES

Filed Sept. 19, 1951 12 Sheets-Sheet 2

IRA L. GRIFFIN,
INVENTOR.

BY Eaton & Bell

ATTORNEYS.

Jan. 11, 1955 I. L. GRIFFIN 2,698,983

CLOSED COVER FOR SLASHER SIZE BOXES

Filed Sept. 19, 1951 12 Sheets-Sheet 3

IRA L. GRIFFIN,
INVENTOR

BY Eaton & Bell

ATTORNEYS.

IRA L. GRIFFIN,
INVENTOR.

BY Eaton & Bell
ATTORNEYS.

Jan. 11, 1955 I. L. GRIFFIN 2,698,983

CLOSED COVER FOR SLASHER SIZE BOXES

Filed Sept. 19, 1951 12 Sheets-Sheet 5

IRA L. GRIFFIN,
INVENTOR.

BY Eaton & Bell

ATTORNEYS.

Jan. 11, 1955 I. L. GRIFFIN 2,698,983

CLOSED COVER FOR SLASHER SIZE BOXES

Filed Sept. 19, 1951

12 Sheets-Sheet 6

IRA L. GRIFFIN,
INVENTOR.

BY Eaton + Bell

ATTORNEYS.

CLOSED COVER FOR SLASHER SIZE BOXES

Filed Sept. 19, 1951

12 Sheets-Sheet 7

IRA L. GRIFFIN,
INVENTOR

BY Eaton + Bell

ATTORNEYS.

Jan. 11, 1955 I. L. GRIFFIN 2,698,983

CLOSED COVER FOR SLASHER SIZE BOXES

Filed Sept. 19, 1951 12 Sheets-Sheet 8

INVENTOR:
IRA L. GRIFFIN.

BY Eaton + Bell
ATTORNEYS.

IRA L. GRIFFIN,
INVENTOR.

BY Eaton & Bell
ATTORNEYS.

Jan. 11, 1955 I. L. GRIFFIN 2,698,983

CLOSED COVER FOR SLASHER SIZE BOXES

Filed Sept. 19, 1951

12 Sheets-Sheet 10

IRA L. GRIFFIN,
INVENTOR.

BY Eaton + Bell

ATTORNEYS.

IRA L. GRIFFIN,
INVENTOR.

BY Eaton & Bell
ATTORNEYS.

IRA L. GRIFFIN,
INVENTOR.

BY Eaton & Bell

ATTORNEYS

United States Patent Office 2,698,983

Patented Jan. 11, 1955

2,698,983

CLOSED COVER FOR SLASHER SIZE BOXES

Ira L. Griffin, Charlotte, N. C.

Application September 19, 1951, Serial No. 247,342

22 Claims. (Cl. 28—28)

This invention relates to apparatus for applying starch and the like to textile yarns and more especially to a closed hood or cover adapted to be mounted atop the usual size box of a slasher for maintaining a relatively high temperature and humidity in the atmosphere surrounding the usual squeeze rolls and other parts of the size box which are normally disposed above the level of the size material, such as starch, starch products, glue, natural gum, synthetic resins or gelatin, disposed within the size box.

In order that the objects of this invention may be fully appreciated, a general review of the process of applying starch to textile yarns preparatory to weaving, and some of the major problems encountered in this process will first be given.

The usual types of slashers heretofore in use have included a size box, having an open topped reservoir, pan or tank which contained a supply of liquid starch or other size material, the tank having means connected thereto for maintaining the starch at a temperature substantially above room temperature or within a range of from approximately 140 degrees F. to 208 degrees F. depending upon the type of size material and the type of yarn being sized.

Heretofore, the parallel strands of yarn have been introduced to the tank at one end thereof and have passed downwardly beneath an immersion roll, which may have been fully or partially submerged in the liquid starch, and from whence the yarn extended upwardly to pass above one or more lower squeeze rolls which were also partially submerged in the liquid starch. There were usually two of these lower squeeze rolls provided which were spaced in parallel relation to each other and driven by suitable means to cause the yarns to be moved through the size box as the yarns were immersed in the size solution or liquid starch.

Now, these lower squeeze rolls have each had resting thereupon and extending in parallel relation thereto an upper squeeze roll which weighed up to seven hundred pounds in a roll approximately sixty inches in length. These upper squeeze rolls have usually been wrapped with several thicknesses of woolen cloth or, in some instances, these rolls have been covered with a coating of rubber approximately one inch thick of a suitable density to provide a cushion for squeezing the surplus starch from the yarns following the immersion of the yarns as they passed beneath said immersion roll.

Now, since the top of the tank has been open and the squeeze rolls have been exposed to the surrounding atmosphere, a hood has usually been provided which was usually suspended about two or three feet above the open top of the box, there being suitable means connected to the hood to create a suction in the hood to draw away the steam vapors developed in the size box as a result of maintaining a temperature in the liquid starch of 140 degrees F. and above.

As the steam rose from the size box and was drawn into the hood and exhausted therefrom, a considerable amount of condensate usually developed in the hood and dripped back onto the yarns and the squeeze rolls. Also, the suction developed in the process of exhausting the vapors through the hood attracted considerable lint, fibers and other foreign matter from the slasher room as well as lowering the normal temperature of the surrounding atmosphere. As a result of this cool air passing the various exposed surfaces of the parts of the size box to which the starch may have adhered during the sizing process, any of the surfaces which were not continuously in agitation or under a constant relatively high temperature would collect a film of starch thereon as a result of evaporating, congealing, or condensing of the starch to a non-fluid state.

Therefore, this has resulted in the starch collecting on the coolest points of the squeeze rolls, which are usually the peripheries thereof adjacent the opposed ends of the squeeze rolls and, as the starch collected and condensed or congealed to a non-fluid state, it picked up additional starch to ultimately form a rather thick ring of starch about opposed ends of each of the squeeze rolls. This congealing or condensing of the starch was further aggravated by the relatively high speeds which are currently employed in textile sizing operations. By way of example, it is not unusual to pass the yarns through the sizing process at a speed of more than ninety yards per minute.

At these high speeds, which require relatively high revolutions per minute of the squeeze rolls and, consequently, more rapid cooling of the starch on the squeeze rolls, this matter of congealing and condensing is a most objectionable problem. The congealed or condensed starch is slung or is thrown off the ends of the rolls after it is formed, drops off into the size box, and then, when these lumps are subsequently carried up to the nip of the squeeze rolls by the yarn, after passing through the size solution, the lumps are crushed in spots and cause the yarns to break at the lease rods, past which the yarns usually move after they have passed from between the squeeze rolls. This causes imperfect weaving and seconds in the finished cloth woven from these yarns.

Another objectionable condition brought about by the relatively high speeds of the squeeze rolls, in the event of the upper squeeze rolls being covered with either woolen cloth or rubber, is that the film of size solution which is picked up by the squeeze rolls upon each revolution thereof tends to dry and, in the instance of the woolen slasher cloth, causes the size solution or liquid starch to impregnate the woolen cloth and to harden thereon thus destroying the resiliency of the cloth surrounding the squeeze rolls. This also causes a starch film to form, in the instance of rubber covered squeeze rolls being employed, to thus minimize the efficiency of the squeeze rolls in the process of smoothly dressing off the surplus starch from the yarns.

The sheet of sized yarns is usually separated into several sheets by lease rods immediately after the yarns have passed between the squeeze rolls and before the starch has dried. Heretofore, in many instances, the lease rods would be spaced from the size box to such an extent that the starch would congeal on the yarns before the yarns were separated by the lease rods, with the result that the congealed and/or condensed starch would be inclined to crumble and adhere in clots or lumps to the lease rods and this would also cause the starch to rupture on the yarns and leave them very rough after drying. A lowering of the temperature of some types of size material as little as four or five degrees F. will alter the viscosity thereof to such an extent as to adversely affect uniform dressing of the yarns.

It is, therefore, an object of this invention to overcome such defects as those above set forth by providing a closed hood or cover mounted on the size box and extending over the entire top of the size box to prevent relatively cool air from passing adjacent the size material in the size box and the top and bottom squeeze rolls. Since the squeeze rolls would then be disposed within the hood, this would prevent the surface of the starch in the size box, as well as the surfaces of the rolls and other parts of the interior of the size box which are contacted by the starch from being subjected to cooler air from the exterior of the size box.

It is another object of this invention to provide a closed hood or cover for a tank of a size box provided with side walls which fit relatively snugly against the upper edges of the side walls of the tank and have suitable openings therein through which the shafts extending from the squeeze rolls extend into the bearings which are usually disposed exteriorly of the tank. The hood also has a suitable transverse slot in the front wall thereof which is of sufficient vertical displacement only for the sheet of yarns to pass through the corresponding front wall of the hood and thus beneath the immersion roll and between the upper and lower squeeze rolls to subsequently be separated by suitable lease bars. The rear wall of the hood also has a suitable transversely extending horizontally disposed opening therein through which the separated sheets of yarns are passed to a suitable drying apparatus. Thus, the temperature and humidity of the atmosphere within the hood and tank are maintained constant, as a result of which the liquid starch will not congeal or condense to a non-fluid state on the upper and lower squeeze rolls or the lease rods disposed within the hood or other parts of the size box which are confined within the hood and the tank.

It is still another object of this invention to provide a closed hood or cover for size boxes of the character described wherein at least one form of the entire hood is hingedly mounted to rest upon the size box and the hood may be raised or lowered by means of a pneumatically or hydraulically operated ram to permit access to the interior of the tank of the size box.

It is still another object of this invention to provide a hood of the type last described with one or more hinged transparent doors which permit the operator to view the interior or the size box during operation of the machine and whereby the hinged doors may be swung open to permit access to a particular area within the tank of the size box.

It is another object of this invention to provide a composite hood of the type described for a tank of a size box which is divided into hinged cover assemblies and the hinged cover assemblies are so arranged that all of the same may be raised collectively or individually to permit access to either the entire tank or a particular portion thereof.

It is another object of this invention to provide a contact closure cover or hood structure for a size box comprising a fixed or stationary hood spaced substantially above the tank of the size box and a vertically movable skirting which extends from the hood to the tank and rests in contact with said tank when in closed position to thereby exclude the relatively cool air exteriorly of the tank from the interior of the tank, the skirting and the fixed hood. Also, the skirting is connected to a suitable counterbalancing means so arranged as to permit an operator to easily raise and lower the skirting relative to the tank and the fixed hood as desired.

Some of the objects of the invention having been stated, other objects will appear as the description proceeds when taken in connection with the accompanying drawings, in which—

Figures 18, 19:
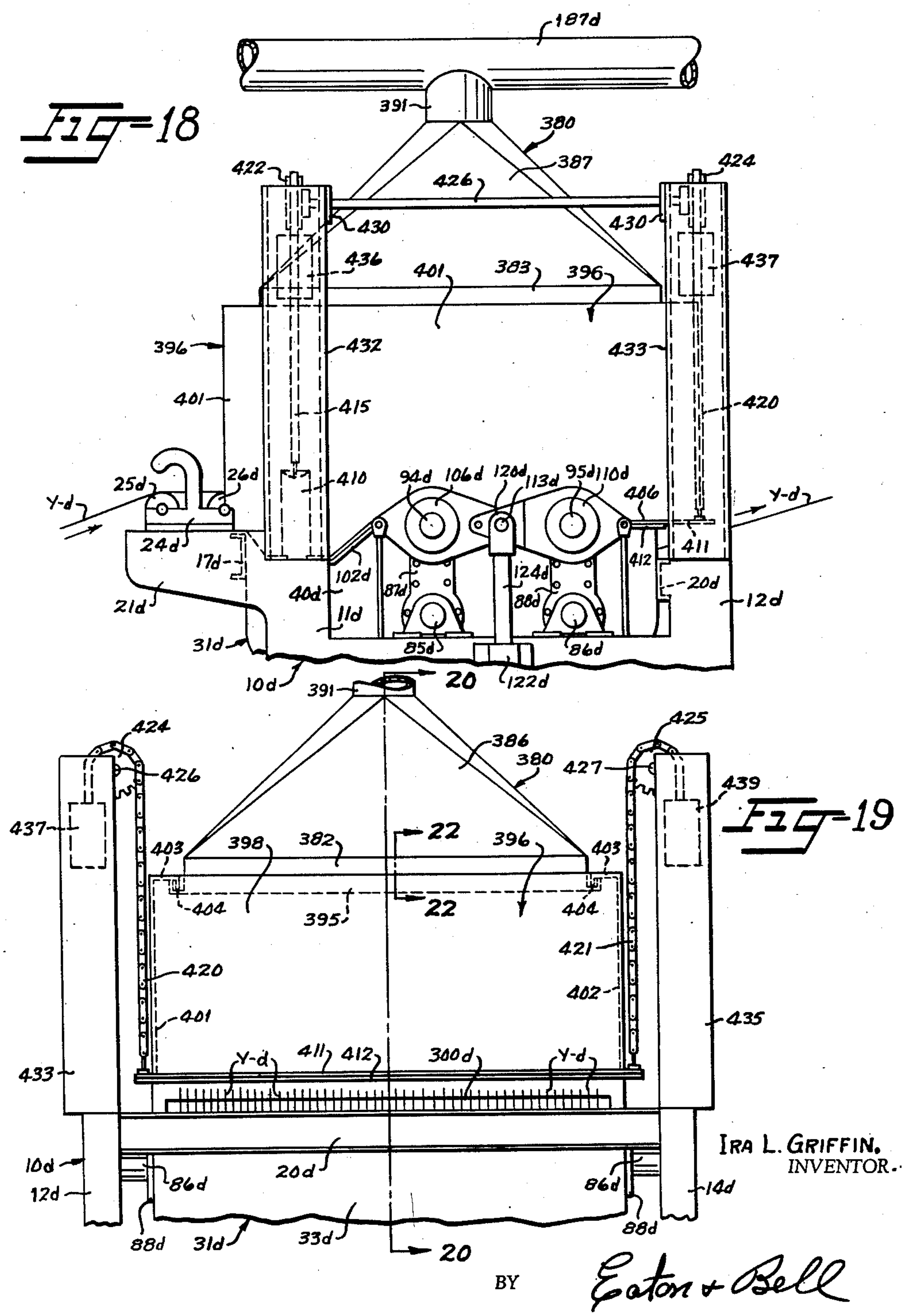
Figure 18 is a fragmentary elevation of a size box showing a fifth form of the invention illustrating another form of hood or contact closure mounted on the size box.
Figure 19 is an elevation looking at the right-hand side of Figure 18 or at the discharge end of the size box.
Figure 22:
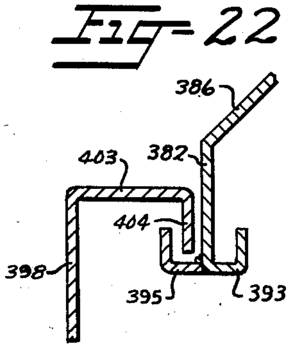

Figure 22 is an enlarged fragmentary vertical sectional view taken substantially along the line 22—22 in Figure 19 and illustrating the manner in which the skirting or vertically movable portion of the hood or contact closure is arranged relative to the stationary or upper hood to thereby prevent the steam or vapors rising from the size solution from escaping from the size box other than through the duct disposed thereabove.

Referring more specifically to the drawings, the numeral 10 broadly designates the frame of the size box which may be of any desired construction.

In this instance, the frame 10 comprises front and rear right-hand upstanding frame members 11 and 12 and front and rear left-hand upstanding frame members 13 and 14. The upstanding frame members 13 and 14 are spaced transversely from the upstanding frame members 11 and 12. The frame members 11 and 12 are spanned intermediate their ends by a horizontally disposed longitudinally extending frame member 15. A similar horizontally disposed frame member 16 (Figures 7 and 8) spans the distance between the vertically disposed or upstanding frame members 13 and 14.

The frame members 15 and 16 are suitably secured to the respective upstanding frame members 11, 12, and 13, as by welding. The distance between the upper ends of the frame members 11 and 13 is spanned by a transverse frame member 17, which is shown in the form of a channel bar, and the distance between the upper ends of the upright frame members 12 and 14 is spanned by a frame member 20, which is also shown as in the form of a channel bar. The upper ends of the upright frame members 11 and 13 are provided with forwardly extending portions 21 and 22 which support suitable bearing members 24 in which opposed ends of a pair of parallel horizontally disposed feed rollers 25 and 26 are journaled.

A sheet of yarns Y is directed to the roll 25 from a suitable source, such as a creel, not shown, and the sheet of yarns Y passes successively over the feed rolls 25 and 26 and then downwardly beneath an immersion roll 27. The immersion roll 27 is partially submerged or may be fully submerged in a liquid size solution, such as starch and the like, indicated at 30. This size solution 30 is disposed in a tank 31 which is preferably formed from sheet metal and of welded construction and is substantially U-shaped in longitudinal vertical section. The tank 31 of the size box includes preformed front and rear walls 32 and 33 and a bottom 34 as well as a false bottom 35 which is spaced above the bottom 34 and through which a supply of heated liquid, such as water, is constantly passed by conventional means, not shown. Thus, the water within the chamber 36, defined by the bottom 34 of the tank 31 and the false bottom 35, assists in heating the liquid size solution or starch 30 disposed within the tank 31.

The tank 31 also has side walls 40 and 41. The tank 31 depends from the transverse frame members 17 and 20 by means of flanges 42 and 43 which are integral with the walls 32 and 33 of the tank 31 and may be suitably secured to the transverse frame members 17 and 20 by any suitable means such as welding. The liquid size 30 in the tank 31 is also maintained at a predetermined temperature of, say, between 200 and 208 degrees F. by a suitable perforated steam coil, various pipes of which are shown in cross-section in Figure 8 and which are indicated at 45. The live steam is directed to the pipes 45 by conventional means, not shown. The temperature of the size material 30 may be as low as 140 degrees F. when synthetic resins are used. Nevertheless, the size material is always maintained at a higher temperature than the air in the slasher room with the result that vapors will rise from the size material in the tank 31.

Since the amount that the sheet of yarns Y is immersed varies with the type of yarn and the type of size solution, the immersion roll 27 is adjustable in a vertical plane. In this instance, the immersion roll 27 is journaled at opposed ends thereof in the lower ends of strap members or arms 50 which extend upwardly and are connected to supports 52 and 53 by means of a transverse shaft 51 which penetrates the strap members 50 and extends beyond the vertical plane of the side walls 40 and 41 and is suitably secured at opposed ends thereof in the vertically movable supports 52 and 53 which are mounted for vertical sliding movement against the respective side walls 40 and 41 of the tank 31 and are held thereagainst by suitable guide blocks 54. The guide blocks 54 are suitably secured to the side walls 40 and 41.

Figure 2:
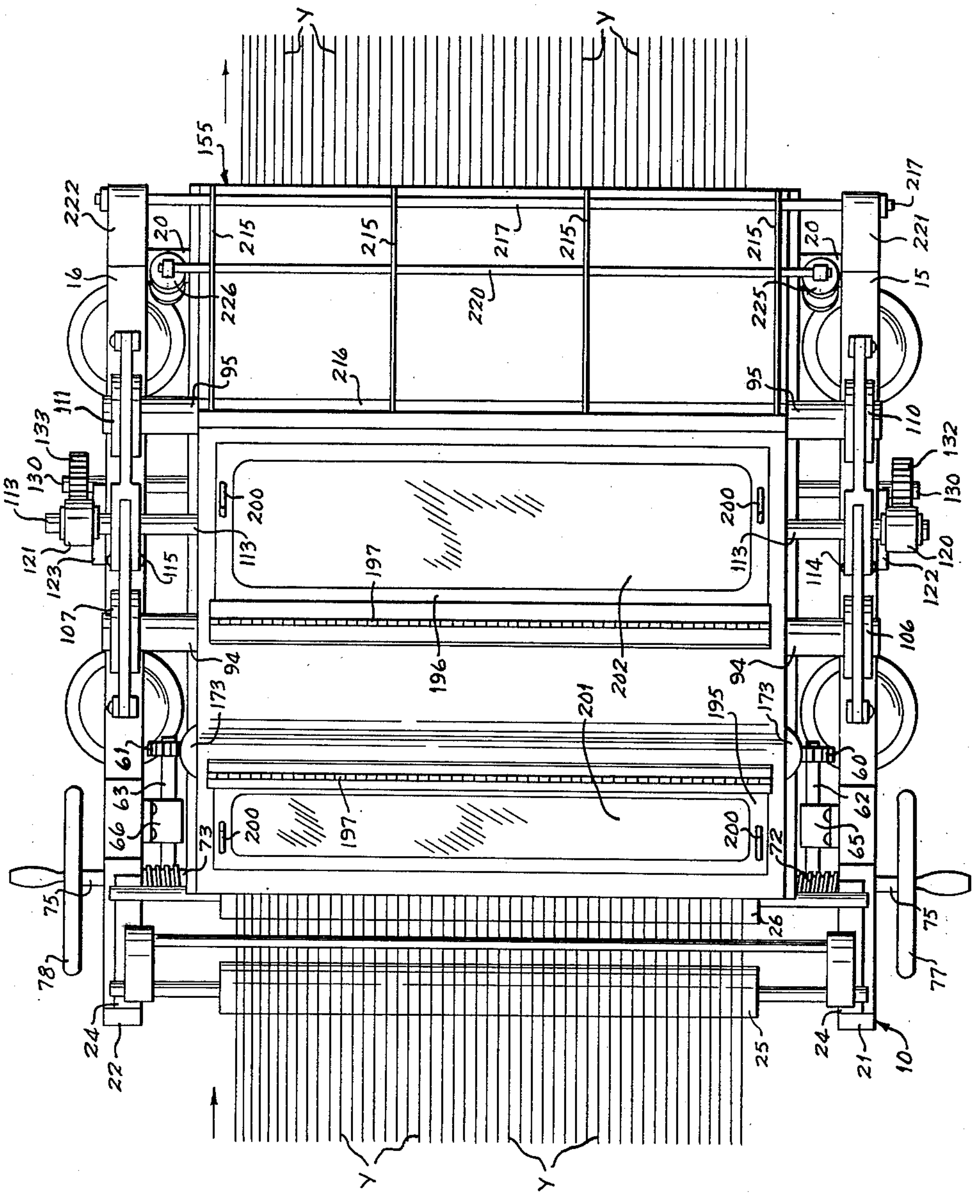
Figure 2 is an enlarged top plan view of the size box shown in Figure 1 and also showing the improved cover or closed hood mounted thereon.

The vertically movable supports 52 and 53 extend downwardly below the lower surface of the bottom 34 of the tank 31 and have respective rack portions 56 and 57 integral therewith which engage respective pinions 60 and 61 (Figure 2).

The pinions 60 and 61 are fixedly mounted on respective longitudinally extending shafts 62 and 63 which are rotatably mounted in suitable bearing blocks 65 and 66 which are suitably secured to the proximate surfaces of the vertically disposed or uprising frame members 11 and 13, respectively.

Figure 7:
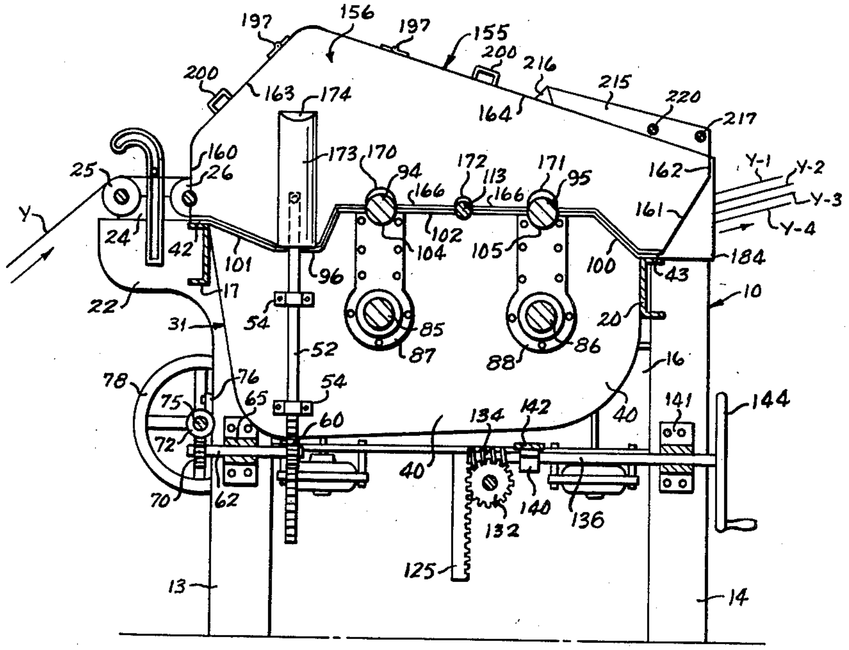
Figure 7 is an elevation at a reduced scale with parts in section looking substantially along the line 7—7 in Figure 3.
Figure 8:
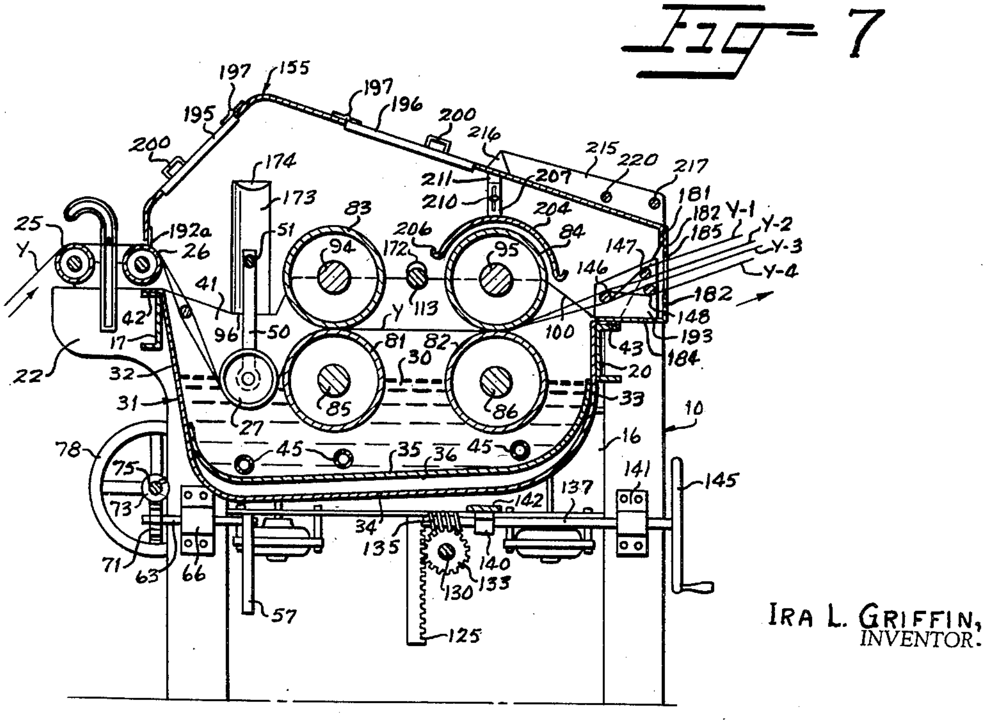
Figure 8 is a partially schematic longitudinal vertical sectional view through the size box and the cover taken substantially along the line 8—8 in Figure 3.

It will be observed in Figures 7 and 8 that these shafts 62 and 63 extend forwardly and have respective worm gears 70 and 71 fixedly mounted thereon which mesh with respective worms 72 and 73. The worms 72 and 73 are fixed on a transverse shaft 75 rotatably mounted in bearing blocks 76 which are suitably secured to the front surfaces of the upright frame members 11 and 13. The shaft 75 extends beyond the upright frame members 11 and 13 and has suitable hand wheels 77 and 78 fixed on opposed ends thereof which may be manipulated by an operator for transmitting rotation to the shaft 75.

It is thus seen that by rotating the shaft 75 in opposite directions, vertical movement may be imparted to the immersion roll 27 in opposite directions, accordingly, to thus determine the depth within the solution that the immersion roll 27 is disposed.

After the sheet of yarns Y has passed beneath the immersion roll 27, it then extends upwardly out of the liquid starch 30 and passes over a pair of lower or bottom squeeze rolls 81 and 82, successively, which are disposed in spaced parallel relation to each other and on which rest respective upper squeeze rolls 83 and 84. In this instance, the bottom squeeze rolls 81 and 82 are fixed on respective shafts 85 and 86 which extend through suitable stuffing boxes 87 and 88 which are disposed in opposed side walls 40 and 41 of the tank 31. Although two sets of squeeze rolls are illustrated, it is to be understood that a lesser or greater number of sets of squeeze rolls may be employed, as desired.

The shafts 85 and 86 are driven by conventional means, not shown, to cause the sheet of yarns Y to move from left to right or rearwardly in Figure 8. The opposed ends of the shaft 85 are rotatably mounted in bearing blocks 91 and the opposed ends of the shaft 86 are rotatably mounted in bearing blocks 92, the bearing blocks 91 and 92 being suitably secured to the upper surfaces of the longitudinally extending frame members 15 and 16 heretofore described.

It will be observed in Figures 7 and 8 that the medial portions of the upper edges of the side walls 40 and 41 are disposed in substantially the same horizontal plane as the axes of shaft portions 94 and 95 extending from the upper squeeze rolls 83 and 84 respectively. However, the left-hand portion of each of the side walls 40 and 41 in Figures 7 and 8 is provided with notches or recesses 96 in the upper edge thereof to accommodate the shaft 51 associated with the immersion roll 27 as vertical movement is imparted thereto, in the manner heretofore described, for varying the position of the immersion roll 27.

The right-hand or rear portions of the upper edges of the side walls 40 and 41 are beveled downwardly, as at 100, and the front portions thereof are beveled upwardly and forwardly as at 101 to thus cause the front and rear upper corners of the side walls 40 and 41 of the tank 31 to be disposed in substantially the same horizontal plane as the forwardly and rearwardly extending flanges 42 and 43 on the respective front and rear walls 32 and 33 of the tank 31. The upper edges of the side walls 40 and 41 are flanged outwardly, as at 102, to support the cover of a closed hood to be later described.

Figure 1:
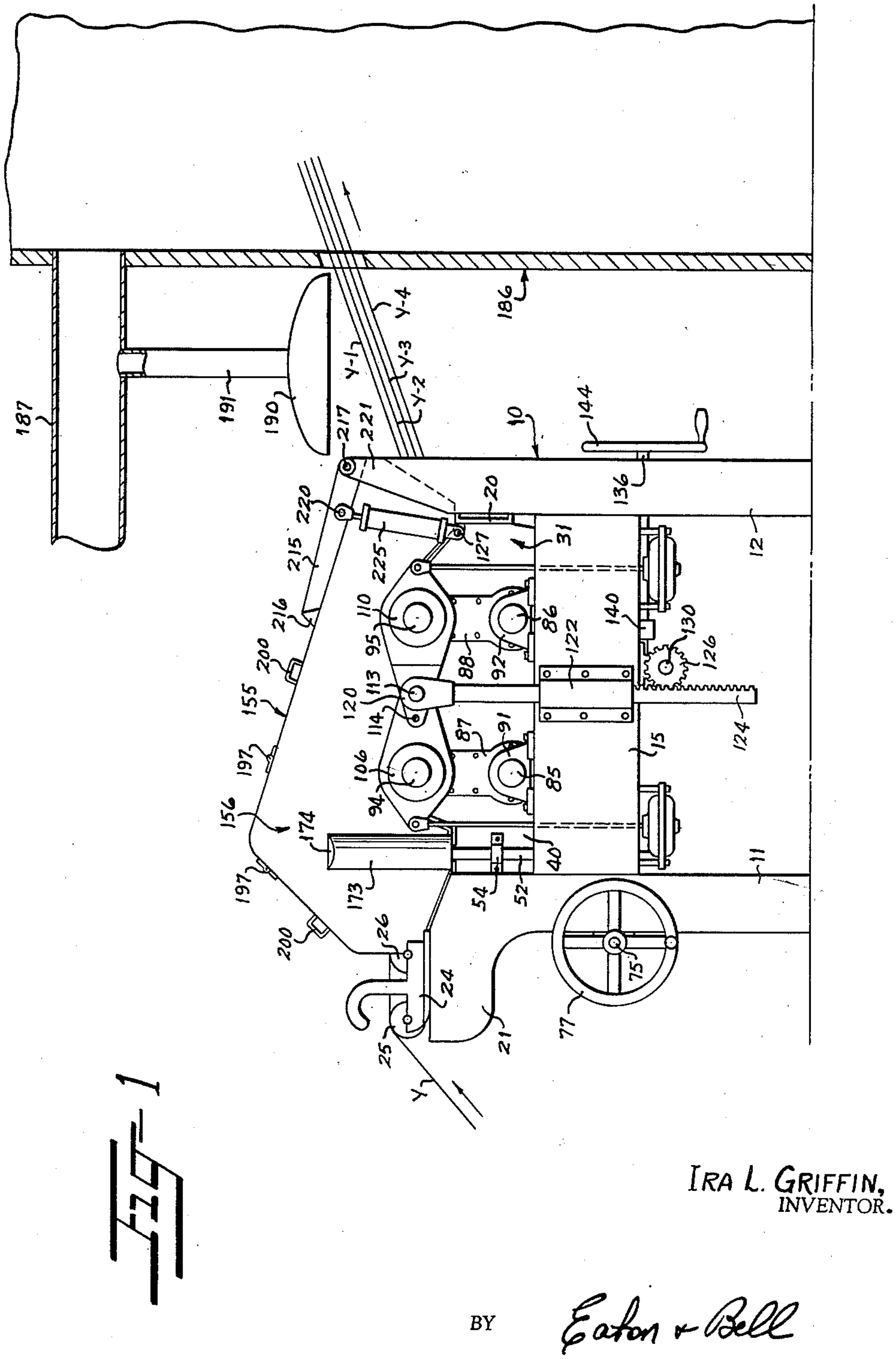
Figure 1 is a side elevation of a size box showing one form of the cover, closed hood or contact closure thereon in closed position and showing sheets of yarns extending therefrom into a suitable drying chamber.

The side walls 40 and 41 are each provided with a pair of notches 104 and 105 at the upper edges thereof through which the shaft portions 94 and 95, respectively, associated with the upper squeeze rolls 83 and 84 extend. These shaft portions 94 and 95 of the squeeze rolls 83 and 84 are rotatably mounted in respective bearing members 106, 107, 110, and 111 which extend inwardly and are pivotally mounted on a common bearing support shaft 113 which extends transversely of the machine and opposed ends of which extend substantially beyond the bearing members 106, 107, 110 and 111. The bearing members 106 and 110 may be held in fixed relation to each other by a suitable pin 114, if so desired, and the bearing members 107 and 111 may also be held in fixed relation to each other by a pin 115, if desired (Figures 1 and 2).

It might be stated that the manner in which the upper squeeze rolls 84 and 85 are supported for rotation may be varied substantially from that described without departing from the spirit of the invention, since the manner in which the squeeze rolls are mounted will not necessarily affect the structure of the hood or cover to be later described.

In this instance, both ends of the shafts 113 are fixedly mounted in the upper ends of vertically disposed squeeze roll shaft supports 120 and 121 which extend downwardly and are mounted for vertical sliding movement in respective guide blocks 122 and 123 suitably secured to the outer surfaces of the longitudinally extending frame members 15 and 16. The supports 120 and 121 extend downwardly beyond the guide blocks 122 and 123 and have respective rack portions 124 and 125 integral therewith which mesh with respective pinions 126 and 127.

The pinions 126 and 127 are fixedly mounted on opposed ends of a transversely extending shaft 130 which is rotatably mounted in bearing blocks suitably secured to the lower surfaces of the longitudinally extending frame members 15 and 16.

The transverse shaft 130 has a pair of worm gears 132 and 133 fixedly mounted thereon, which mesh with worms 134 and 135 (Figures 7 and 8) fixed on the front ends of corresponding rearwardly extending shafts 136 and 137. The shafts 136 and 137 are rotatably mounted in bearing blocks 140 and 141, the bearing blocks 140 being suitably secured to the lower surfaces of a transverse bar 142 spanning the distance between and being suitably secured to the lower surfaces of the longitudinally extending frame members 15 and 16. The bearing blocks 141 are suitably secured to the proximate surfaces of the rear upstanding frame members 12 and 14.

The shafts 136 and 137 extend rearwardly and have suitable hand wheels 144 and 145 fixedly mounted thereon either or both of which may be manipulated by an operator raising and lowering the upper squeeze rolls 83 and 84 as desired.

After the sheet of yarns Y has passed between the upper and lower squeeze rolls 83 and 81 and 84 and 82, respectively, the sheet Y passes upwardly and rearwardly at an angle and is separated into sheets of yarns Y–1, Y–2, Y–3 and Y–4 by means of spaced lease rods 146, 147 and 148. Although, three of these rods 146, 147, and 148 are shown in Figure 8, it is to be understood that a greater or lesser number of lease rods may be employed for separating the original sheet of yarns Y into a greater or lesser number of sheets as desired. It will be noted that these lease rods 146, 147, and 148 are disposed within the confines of the hood or cover, to be presently described, so the yarns are separated by the lease rods immediately after they have passed from between the squeeze rolls 82 and 84 and before the sheets of yarns Y–1, Y–2, and Y–4 are exposed to the outside atmosphere.

This is particularly desirable because, if a sheet of 3000 or 4000 yarns are grouped together with starch and then dried, it is difficult to separate one yarn from another with lease rods which are spaced substantially from the size box without causing considerable damage to the yarn. This damage may be in the form of rupturing the starch film, thereby creating rough edges and, in many instances, the separating of one yarn from another after the starch has dried will cause the fibers to be broken and separated and, in turn, causes shedding of the starch and fibers at the slasher as well as at the loom in which the yarns are subsequently woven into cloth.

It is most desirable to separate the original sheet of yarns into as many subsequent sheets as is possible between the size box and the drying apparatus. Heretofore, this has not been practical because, as the yarn leaves the bite of the squeeze rolls at the size box traveling at the relatively high speed of from 50 to 90 yards per minute, the size solution on the yarns is cooled and substantially dried within twelve to eighteen inches after leaving the squeeze rolls. Therefore, in order to employ more than one lease rod, the lease rods would have to be placed so far away from the tank 31 that the separating of the yarns would have to take place at a point spaced from the contents of the tank and subjected to the atmosphere adjacent the size box and at which point the starch would ordinarily be congealed or condensed to a non-fluid state.

Under these conditions, the congealed or condensed starch is inclined to crumble and cause lumps of dried starch on the lease rods and will cause the starch film on the yarns to rupture thus leaving the yarns relatively rough after drying. This is particularly objectionable in subsequently using the yarn for weaving cloth.

However, in view of the fact that all of the lease rods 146, 147, and 148 are disposed within the confines of the hood to be persently described, the starch remains wet and it does not congeal or condense until after the yarns have been separated by the lease rods and have passed beyond the lease rods.

It is evident that the lease rods could be positioned exteriorly of the cover or enclosure, provided that they are positioned in close proximity to said enclosure, without adversely affecting the yarns, because the size solution does not tend to dry until it has moved from twelve to eighteen inches from the enclosure, depending upon the speed at which the yarns are moving.

Although a specific type of size box has been described, it is to be understood that the present invention may be employed in association with many other types of size boxes and it is with any suitable size box that the present invention is adapted to be associated.

Now, in order to prevent the size solution, which may be starch, starch products, glue, natural gum, synthetic resins or gelatin, from accumulating on the squeeze rolls 81 to 84, inclusive, and the lease rods 146 to 148, inclusive, and other adjacent parts of the size box as set forth in the brief summary of the invention apeparing earlier in this context, the immersion roll 27, the squeeze rolls 81 to 84, inclusive, and the lease rods 146 to 148, inclusive, are completely enclosed. To this end, I have provided a closed hood, contact closure or cover broadly designated at 155 which is pivotally mounted on the frame 10, in a manner to be later described, and normally rests upon the flanged upper edges of the walls 32, 33, 40 and 41 of the tank 31 in such a manner as to confine substantially all of the steam which rises from the sizing solution 30 within the tank 31 and the hood 155 to thereby exclude the cooler outside air from the tank and to cause the squeeze rolls 83 and 84, the lease rods 146, 147 and 148 and the adjacent parts of the size box above the level of the heated size solution to be heated and moistened throughout the operation of the size box.

The cover or hood 155 may be constructed differently from that disclosed without departing from the spirit of the invention, the structure of the cover or hood 155 as illustrated being a preferred embodiment of the invention. It is to be understood, therefore, that the specific manner in which the hood or cover 155 is constructed is not to be construed as a limitation.

The preferred form of hood or cover 155, as illustrated in the drawings, comprises substantially triangularly-shaped side walls 156 and 157, each of which has a substantially vertically extending front edge 160 and an upwardly and rearwardly extending angularly-disposed rear edge 161. The rear edge joins a vertical rear edge 162 which extends in substantially parallel relation to the front edge 160 and the edges 160 and 162 are connected at their upper ends to respective upwardly converging angularly-disposed upper edges 163 and 164.

The lower corners of the front and rear edges 160 and 161 of each of the side walls 156 and 157 are disposed in substantially the same horizontal plane when the cover or hood 155 is in the closed position shown in Figures 1, 7 and 8. The lower edges of the side walls 156 and 157 of the cover 155 are generally provided with respective outwardly extending flanges 166 and 167. Each of the flanges 166 and 167 is interrupted by substantially semi-circular openings 170, 171 and 172 in the lower edges of the side walls 156 and 157. The shaft portions 94 and 95 on the upper squeeze rolls 83 and 84 extend through the openings 170 and 171 when the hood or cover 155 is in a lowered or closed position. The opening 172 in each side wall 156 and 157 is provided to accommodate the transverse shaft 113. Since the squeeze rolls 83 and 84 may vary as to elevation with respect to the squeeze rolls 81 and 82, depending upon the thickness and density of the yarn passing between the squeeze rolls 81 and 83 and 82 and 84, it is preferable that the upper walls of the openings 170, 171 and 172 are normally spaced from the upper surfaces of the shaft portions 94 and 95 and the shaft 113, respectively, when the hood or cover 155 is in a closed position as shown in Figures 7 and 8.

Each flange 166 and 167 is also interrupted by an elongated substantially semi-circular hollow projection 173 which extends from the flange 166 upwardly and terminates in spaced relation to the apex of the edges 163 and 164 on each of the side walls 156 and 157. The upper end of each of the hollow projections 173 is closed, as at 174, to thereby prevent the steam from escaping at this point from the hood 155 and the tank 31.

It will be noted that the flanges 166 and 167, which define the lower edges of the side walls 156 and 157 are irregular in shape longitudinally of the hood 155 to conform to the irregular shape of the upper edges of the side walls 40 and 41 of the tank 31. Thus, when the hood or cover 155 is in a lowered or closed position, the flanges 166 and 167 rest upon the flanges 102 projecting outwarly from the upper edges of the side walls 40 and 41. This insures that the lower edges of the side walls 156 and 157 of the hood or cover 155, when the hood 155 is in closed position, are disposed in substantially the same horizontal plane as the axes of the upper squeeze rolls 83 and 84 and the axis of the shaft 113. This also insures that the semi-circular projections 173 extending from the outer surfaces of the side walls 156 and 157 of the hood 155 surmount the upper portions of the immersion roll support members 52 and 53 to permit freedom of movement of the upper portions of these support members 52 and 53 within the hollow semicircular projections 173 on the side walls 156 and 157 of the hood or cover 155.

The hood or cover 155 may be of cast construction or may be made from sheet metal with the various parts thereof suitably connected together as by welding. The distance between the side walls 156 and 157 is spanned at thier front edges 160 by a vertically disposed front wall 176. A front upwardly and rearwardly extending angularly disposed wall 177 is connected at its lower edge to the upper edge of the wall 176, this angularly disposed front wall 177 spanning the distance between the edges 163 of the side walls 156 and 157.

Figure 4:
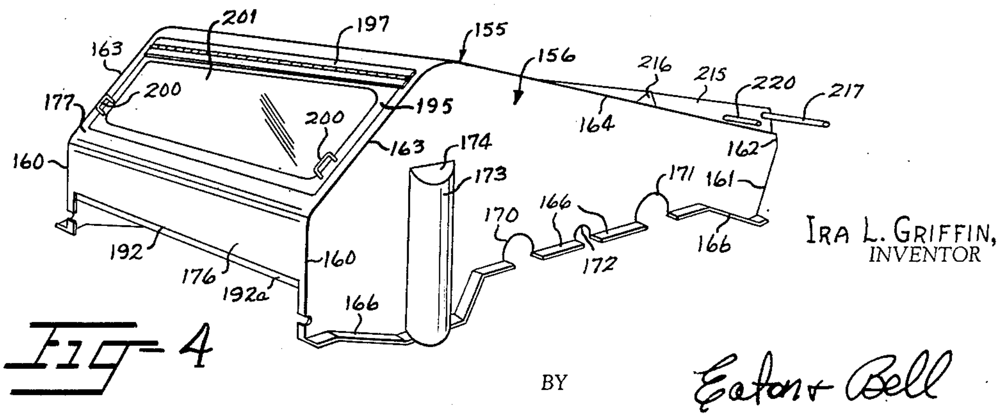
Figure 4 is an isometric view of the hood or cover removed from the size box and looking at the front and the right-hand side thereof or as though looking at the left-hand lower corner of Figure 2.

The angularly disposed front wall 177 may be integral with the front wall 176 as shown in Figure 4 or may be separate therefrom and welded or otherwise secured to the front wall 176. The rear upper portion of the wall 177 curves downwardly and rearwardly to form an angularly disposed rear wall 180 which spans the distance between the upper edges 161 of the side walls 156 and 157. A rear vertically disposed wall 181 spans the distance between the rear edges 162 of the side walls 156 and 157. Since the wall 180 is disposed at a relatively acute angle relative to the horizontal, this wall 180 may also be considered to be the top wall of the hood or cover 155.

The rear wall 181 of the hood or cover 155 normally engages a vertically disposed plate 182 having an elongated slot or opening 185 therein through which the sheets of yarn Y–1, Y–2, Y–3 and Y–4 extend from the lease rods 146, 147 and 148 to a suitable drying apparatus indicated generally at 186 (Figure 1). The plate 182 has a horizontal portion 184 projecting forwardly therefrom which is suitably secured at its front edge, as by welding, to the upper surface of the flange portion 43 integral with the rear wall 33 of the tank 31.

The slasher is usually disposed closely adjacent the drying apparatus 186 which is provided with suitable suction or fan means therein for exhausting the moisture from the drying apparatus 186 through a duct 187. It is preferable that a suitable hood 190 be provided above the portions of the yarns extending between the size box and the drying apparatus 186, this hood 190 having a suitable pipe or duct 191 extending upwardly therefrom and communicating with the duct 187 to thus carry away the steam which rises from the sized yarns as they pass through the opening 185 in the size box and into the drying apparatus 186. The drying apparatus 186 and the hood 190 do not necessarily constitute a part of the present invention.

Now, it will be observed in Figures 4 and 8 that the front wall 176 of the hood or size box cover 155 is cut away to provide an opening 192 therein and this front wall 176 is disposed in substantially the same vertical plane as the axis of the roll 26, this opening 192 being provided to accommodate the roll 26 and to permit ingress of the sheet of yarns Y into the tank 31. Since the sheet of yarns Y is relatively cool as it enters the confines of the size box cover 155 and the tank 31, it is preferable that a suitable resilient seal member 192*a* be provided and which bears against the upper surfaces of the yarns as they pass over the roll 26.

The seal member 192*a* may be made from rubber, felt, leather, fabric and other suitable material and is suitably secured to the inner surface of the vertically disposed front wall 176 of the hood or cover 155. A seal member is not deemed necessary at the opening 185 at the rear of the slasher, or at the right-hand end thereof in Figure 8, because the temperature of the contents of the tank 31 and the steam rising from the size solution will cause a positive pressure within the cover 155 and the tank 31 with the result that the excessive steam will escape through the opening 185 and will prevent cool air from entering the opening 185.

The lease rods 146, 147, and 148 heretofore described may be supported in any desired manner and, in the present instance, opposed ends of the lease rods are suitably mounted in plates or brackets 193 disposed adjacent the inner surfaces of the walls 156 and 157 and being suitably secured to the upper surface of the horizontal portion 184 of the plate 183.

The angularly disposed walls 177 and 180 are preferably provided with respective doors 195 and 196 which are hingedly mounted, as at 197, on the respective walls 177 and 180. These doors 195 and 196 are shown in elevation in Figure 8. Each of the doors 195 and 196 is provided with suitable handles 200 projecting upwardly therefrom which may be grasped by an operator for opening the doors 195 and 196 to gain access to the interior of the hood 155 without the necessity of elevating the hood. The doors 195 and 196 are preferably provided with transparent panels 201 and 202, respectively, which may be made from glass, plastic, or any other suitable material, and which are provided to permit the operator to observe the parts disposed within the hood 155 and the tank 31 without the necessity of opening the doors 195 and 196 or elevating the hood 155.

As the steam from the size solution 30 rises, it condenses on the lower surfaces of the angularly disposed walls 177 and 180 of the hood or cover 155 and thus tends to adhere thereto as it flows downwardly and thus back into the tank 31. However, the walls 177 and 180 are preferably made from a relatively thin material and, accordingly, the doors 195 and 196 must be made from a thicker material in order to accommodate the thickness of the transparent material 201. Thus, the lower edges of the doors 195 and 196 interrupt the flow of the condensed moisture and cause the moisture to drip from the lower edges of the doors 195 and 196.

This condition is not detrimental to the process of applying starch to the yarns adjacent the opening 192 in the front vertically disposed wall 176 because the yarn is subsequently immersed in the size solution or liquid starch 30. However, the lower edge of the door 196 is disposed above the upper squeeze roll 84 and this would normally cause the moisture therefrom to drip onto the upper squeeze roll 84 and would cause the yarns to be saturated after they had passed from between the squeeze rolls 82 and 84.

Therefore, a shield or moisture deflecting member 204 is provided which surmounts the squeeze roll 84 and the front and rear edges of which are provided with upturned portions, troughs or gutters 206 to thereby cause the moisture which falls from the lower edge of the door 196 to flow down the moisture deflecting member 204 and into the gutters 206 and to thus direct the liquid to points immediately adjacent the side walls 156 and 157, the opposed ends of the moisture deflecting member 205 being spaced closely adjacent the side walls 156 and 157 to this end. The moisture deflecting member 204 is mounted for vertical adjustment relative to the side walls 157 and 156 by suitable upwardly extending slotted bars 207 on opposed ends thereof, only one of which is shown in Figure 8.

The slotted bars 207 are penetrated by respective screws 210 which are threadably embedded in strap members 211 depending from the upper wall 180 of the hood or cover 155. Thus, the displacement between the lower surface of the moisture deflecting member 204 and the upper surface of the upper squeeze roll 84 may be adjusted as desired to accommodate a squeeze roll of varying diameter.

Now, the hood or cover 155 has heretofore been described as resting upon the upper edges of the side walls of the tank 31. It is occasionally necessary to raise the hood or cover 155 for the purpose of cleaning the size box and replacing or recovering the squeeze rolls 83 and 84 or for various other purposes. To this end, the upper or rear angularly disposed wall 180 of the hood 155 has a plurality of transversely spaced longitudinally extending ribs 215 suitably secured to the upper surface thereof. The front ends of the ribs 215 are suitably connected to a transverse member 216 as by welding. This member 216 serves as a reenforcement for the upper wall 180 of the hood 155 as well as a reenforcement for the front ends of the ribs 215. The ribs 215 are penetrated by a pair of longitudinally spaced transverse shafts or rods 217 and 220 which may be secured in the ribs 215 by any suitable means, such as welding.

Figure 3:
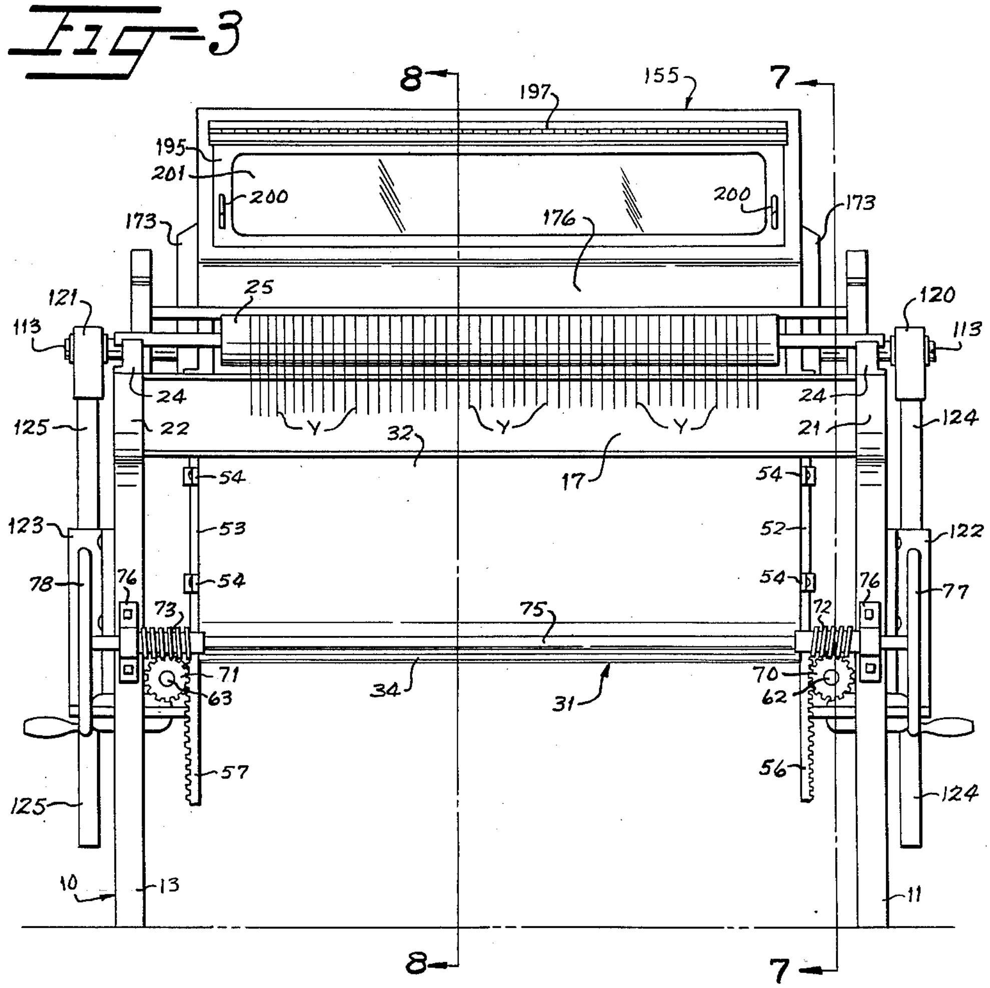
Figure 3 is a front end elevation of the size box looking at the left-hand side of Figure 1 and also showing the hood or cover mounted thereon.
Figure 5:
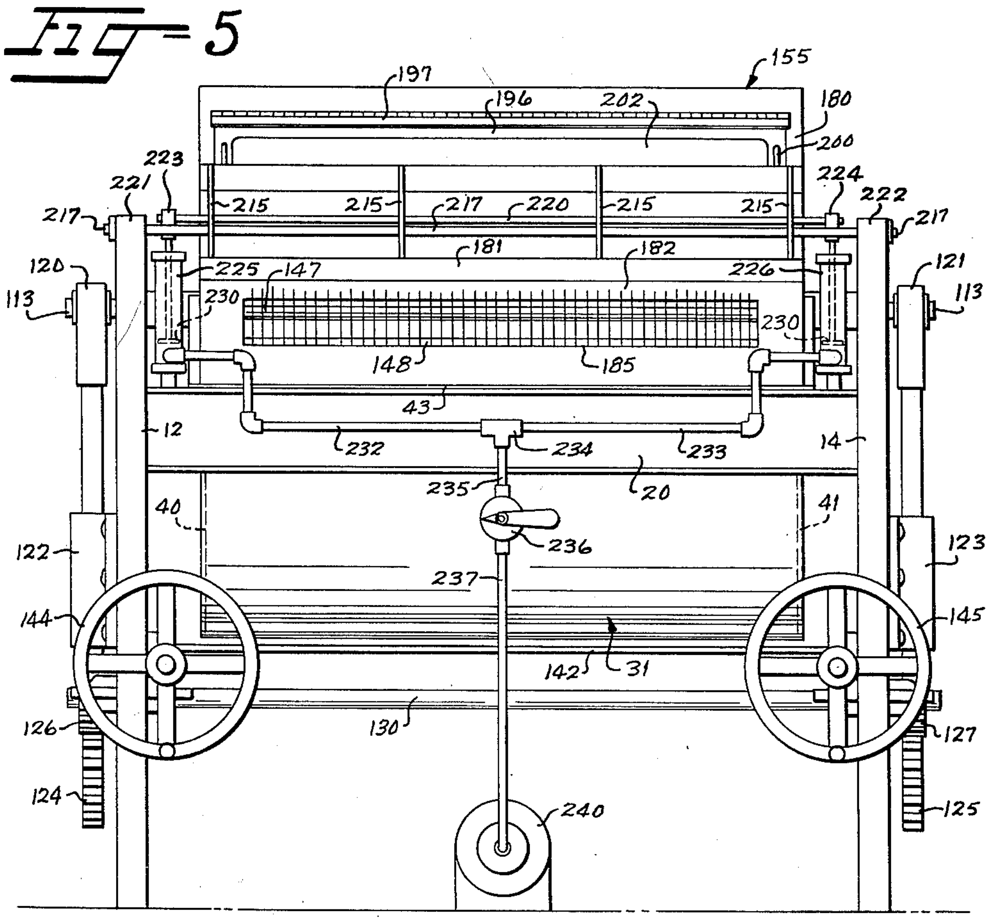
Figure 5 is a rear or discharge end view of the size box showing the hood or cover mounted thereon.
Figure 6:
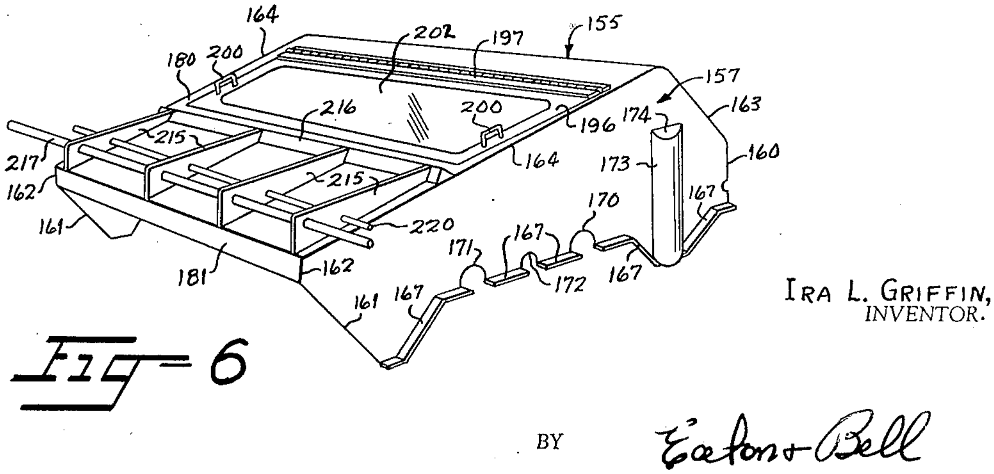
Figure 6 is a view similar to Figure 4 but looking at the opposite side thereof from that shown in Figure 4.

It will be observed in Figures 2, 3 and 5 that the side walls of the hood 155 and the tank 31 are spaced substantially inwardly of the corresponding upstanding frame members 11, 12, 13 and 14 and the longitudinally extending frame members 15 and 16. However, the shaft 217 extends substantially beyond opposed sides of the hood 155 and is oscillatably mounted in upwardly extending portions 221 and 222 integral with the rear upstanding frame members 12 and 14 to thus hingedly support the hood 155.

The upper ends of piston rods 223 and 224 are pivotally connected to opposed ends of the transverse shaft 220, which is disposed forwardly of the transverse shaft 217, and these piston rods 223 and 224 extend downwardly and slidably penetrate the head ends of substantially vertically disposed cylinders 225 and 226, respectively. The piston rods 223 and 224 and the cylinders 225 and 226 may be termed as rams collectively. The lower ends of the cylinders 225 and 226 are pivotally connected, as at 227 (Figure 1) to the transverse frame member 20.

Each of the cylinders 225 and 226 has a piston 230 mounted for vertical sliding movement therein and to which the lower end of the corresponding piston rods 223 and 224 are suitably secured. In this instance, the cylinders 225 and 226 are single-acting cylinders and have pipes 232 and 233, respectively, connected thereto which extend inwardly and are connected to opposed sides of a pipe T 234 which has a branch pipe 235 connected thereto. The branch pipe 235 is connected to a suitable control or regulator valve 236 shown schematically in Figure 5 and to the other side of which a pipe 237 is connected.

The pipe 237 extends to a suitable source of compressed air or hydraulic fluid as indicated by a tank 240. The valve 236 is of a type which will exhaust compressed air from the pipes 232 and 233 upon occasion and, by manipulation thereof, the compressed air or fluid may be directed from the tank 240 to the lower ends of the cylinders 225 and 226.

It is thus seen that the compressed air may be introduced to or exhausted from the cylinders 225 and 226 and, upon compressed air being introduced to the lower ends of the cylinders 225 and 226, the pistons 230 and the corresponding piston rods 223 and 224 will move upwardly to thus cause the hood or cover 155 to pivot about the shaft 217 thus elevating its front end to permit access to the elements disposed within the hood 155 and the tank 31.

It is evident that the sheet of yarns Y may be introduced to the interior of the hood 155 and the tank 31, when the hood 155 is in a lowered or closed position by passing the yarn between a pair of superposed parallel rolls wherein another roll will be disposed above the roll 26 and the sealing member 192 would then engage the upper surface of the upper roll rather than the upper surface of the sheet of yarns Y to further insure that the steam within the hood 155 and the tank 31 would not escape through the opening provided for the roll 26.

It is evident that a hood of the type shown will obviate the necessity of providing an open hood above the size box and will thereby exclude the probability of lint or foreign matter from the yarns being processed from being drawn into the hood and subsequent to which some of the lint would ordinarily probably fall into the tank 31 and become fixed to the yarn by the medium of the starch film as has heretofore been the case. This is a particularly important advantage of the present size box cover, since a considerable amount of lint and other foreign matter is caused to be present in the atmosphere surrounding a slasher or other machinery in a textile processing plant, as a result of sweeping and cleaning the machinery, particularly wherein air pressure is employed, because this foreign matter and lint has often resulted in "seconds" in the quality of the cloth woven from yarns previously sized under the adverse conditions described.

In addition to minimizing the congealing and condensing of the size material to a non-fluid state at the opposed ends of the squeeze rolls 83 and 84, the hood 155 also prevents the surrounding air from cooling the starch on the woolen blanket or rubber covering which usually surrounds the upper squeeze rolls and, therefore, causes the blanket to clean itself of liquid starch and prolong the life of the blanket substantially above that of blankets heretofore in use.

Another important feature of this type of hood is that, by maintaining the temperature and moisture of the starch, the starch is prevented from congealing or condensing and forming a film across the entire sheet of yarns when the slasher is stopped for any length of time, such as for changing the warp beams to which the yarn may be directed after it has passed through the drying apparatus 186. Such a film extending across the sheet of yarns has also occurred heretofore in the event of a lap or broken yarn being found in the creel of the unsized yarn as it was introduced to the size box. When the laps or tangled yarns occur, the speed of the squeeze rolls 81 to 84, inclusive, has to be relatively decreased and stopped at intervals in order to straighten out and tie up the disarranged and parted yarns.

Heretofore, when a sheath or film of starch has congealed or condensed across the web of the yarns being sized, the film would not flow off of the yarn when it came into contact with the nip of the squeeze rolls but, instead, has passed through the squeeze rolls in the form of a thick, mushy sheet of size and has, consequently, been dried and has formed what is known as "hard size" all the way across the sheet. This has resulted in the yarns breaking at the dry lease rods and has, in many instances, caused a number of the yarns to break in the loom as the yarns were subsequently being woven into cloth thereby resulting in "seconds."

However, this defect has been overcome by an enclosed size box. The liquid state of the size solution is maintained by the steam vapors from the contents of the tank 31 and although a slight rupture of the film on the yarns may occur at the lease rods, this rupture would be healed by the flowing of the starch back into place to thereby result in a smooth surface on the yarns.

*Second form of invention*

Figure 9:
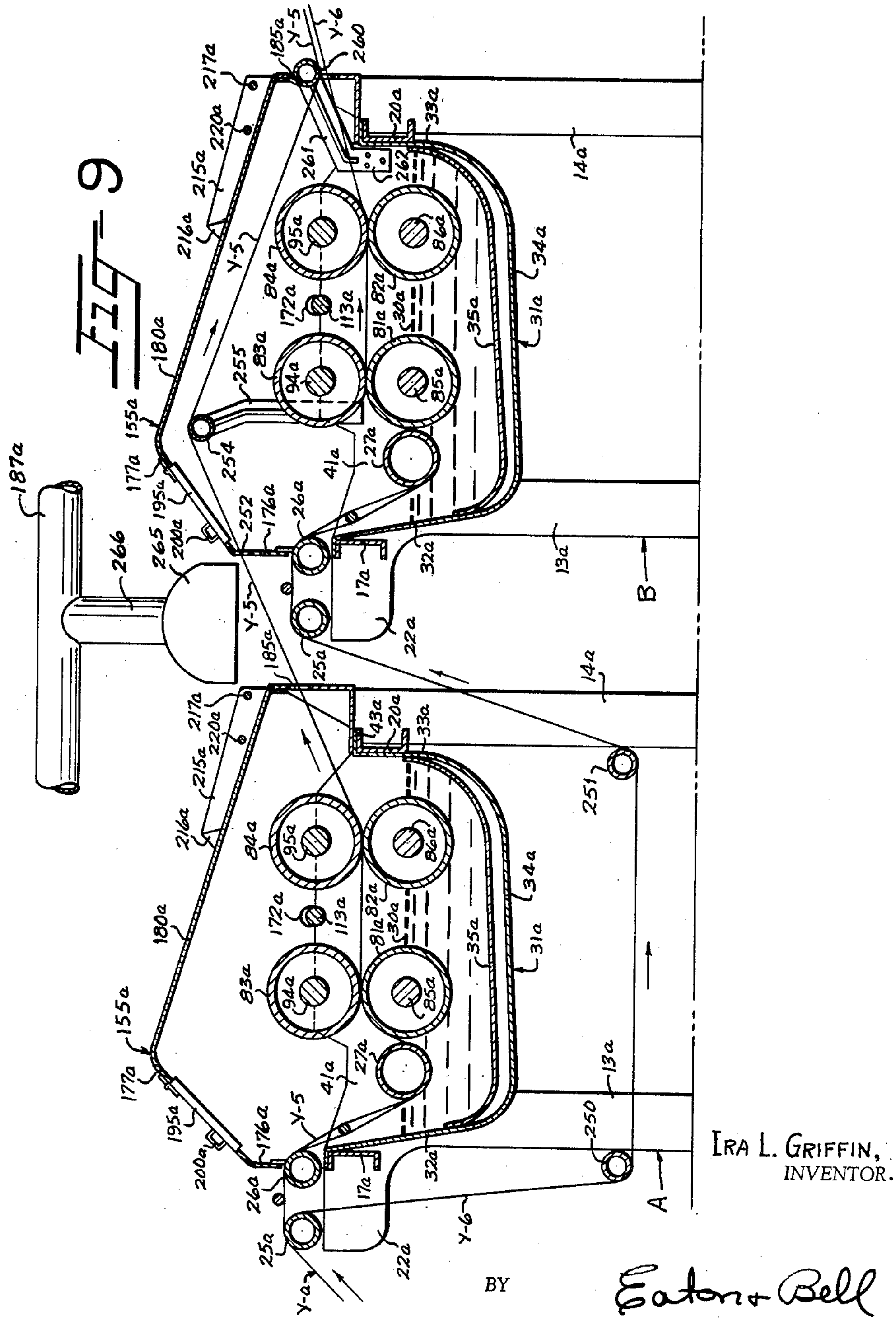
Figure 9 is an illustration of a slightly modified or second form of the invention wherein a pair of size boxes are arranged in tandem, the size boxes being shown schematically.

It will be observed in Figure 9 that slight modifications may be necessary to the present invention in order that two or more size boxes may be arranged in tandem. Figure 9 is a schematic illustration of the parts heretofore described with the exception of the modifications thereof and, in order to avoid repetitive description, those parts shown in Figure 9 which are identical to the original form of the invention will bear the same reference characters with the letters *a* affixed thereto.

It will be noted in this second form of the invention that a first size box is shown which is indicated at A and the tandem or second size box is indicated generally at B. The sheet of yarns Y–*a* is separated into two sheets indicated at Y–5 and Y–6 as it is introduced to the size box A, the sheet Y–6 passing downwardly between the rolls 25*a* and 26*a* while the sheet Y–5 continues over the roll 26*a* in the identical manner in which the sheet of yarns Y passes through the size box shown in Figure 8. However, the sheet of yarns Y–5 is not necessarily separated into several separate sheets before it passes through the opening 185*a* at the rear of the slasher A.

Size boxes are usually arranged in tandem as shown in Figure 9 when the number of yarns per inch is such that the yarns would be too congested upon passing through the size solution or liquid starch in a single size box to insure that the entire periphery of each yarn was thoroughly coated with the liquid starch. Therefore, the sheet of yarns Y–6 extends below the tank 31*a* associated with the first size box A by means of a pair of idler rollers 250 and 251 which may be suitably rotatably mounted on the upstanding frame members 13*a* and 14*a*, it being understood that frame members identical to the frame members 11 and 12 shown in Figure 1 are provided on size box A.

The sheet of yarns Y–6 then extends upwardly from the roller 251 and passes over the rollers 25*a* and 26*a* associated with the size box B. Now, the hood 155*a* associated with the tandem size box B differs from the hood 155 shown in Figures 1 to 6, inclusive, in that the front wall 176*a* is provided with a relatively narrow slot or inlet opening 252 which is disposed closely adjacent the junction of the angularly disposed front wall 177*a* and the upper edge of the front wall 176*a*.

Now, the sheet of yarns Y–6 passes through the size box B in the identical manner in which the sheet Y–*a* passes through the size box A. However, the sheet of yarns Y–5 passes through the opening 185*a* in the size box A, through the opening 252 in the front wall 176*a* of the size box B and then passes over an idler roll 254 which is disposed closely adjacent the apex of the hood 155*a*, that is, adjacent the juncture of the corresponding front and rear angularly disposed walls 177*a* and 180*a*.

This idler roll 254 may be supported in any desired manner and is shown in Figure 9 as being supported for rotation on an upstanding bar or bracket 255, there being a similar bracket, not shown, adjacent the opposite wall of the hood 155*a* of the size box B. Each of the brackets 255 extends downwardly and is suitably secured to the inner surfaces of the side walls of the tank 31*a* associated with the size box B. The sheet of yarns Y–5 then passes downwardly and rearwardly at an angle in substantially parallel relation to the top or rear angularly disposed wall 180*a* of the hood 155*a* associated with the size box B and then passes beneath an idler roll 260. The idler roll is rotatably mounted at opposed ends thereof in bearing brackets 261, only one of which is shown and which extends downwardly and forwardly at an angle and each of which is provided with a vertically extending portion 262 which is suitably secured to the inner surface of the corresponding side wall of the tank 31*a* of the size box B to thus permit the hood 155*a* of the size box B to be elevated in the manner heretofore described for the hood 155 shown in the original form of the invention, It will be noted that a door similar to the door 196 shown in Figure 8 has been omitted from the illustration in Figure 9 since it may be desirable to eliminate the door in the upper wall 180*a* in certain instances. By eliminating the door from the upper wall 180*a*, the condensate resulting from the steam rising from the liquid starch in the tank 31*a* will flow downwardly and rearwardly against the upper surface of the wall 180*a* and will pass beyond the vertical plane of the rear upper squeeze roll 84*a* before the droplets of liquid thus formed fall back into the tank 31*a*. This obviates the necessity of providing a deflecting shield such as the member 204 shown in Figure 8.

It will be noted that the roll 260 is positioned so the sheet of yarns Y–6 will not engage the sheet of yarns Y–5 as these sheets pass outwardly through the opening 185*a* in the size box B. Thus, the roll 260 is substituted for the lease rods shown in Figure 8.

It is preferable that a suitable hood 265 be provided above the path of travel of the yarns as they pass from the size box A to the size box B, this hood 265 being connected to the duct 187*a* heretofore described by means of a branch duct 266. The duct 187*a* in Figure 9 is the equivalent of the duct 187 in Figure 1 and may have a suitable suction apparatus connected thereto to cause the duct 187*a* to carry away the excess moisture and steam from the sheet of yarns Y–5 as it passes through the opening 185*a* and into the opening 252 of each of the size boxes A and B.

*Third form of invention*

Figure 10:
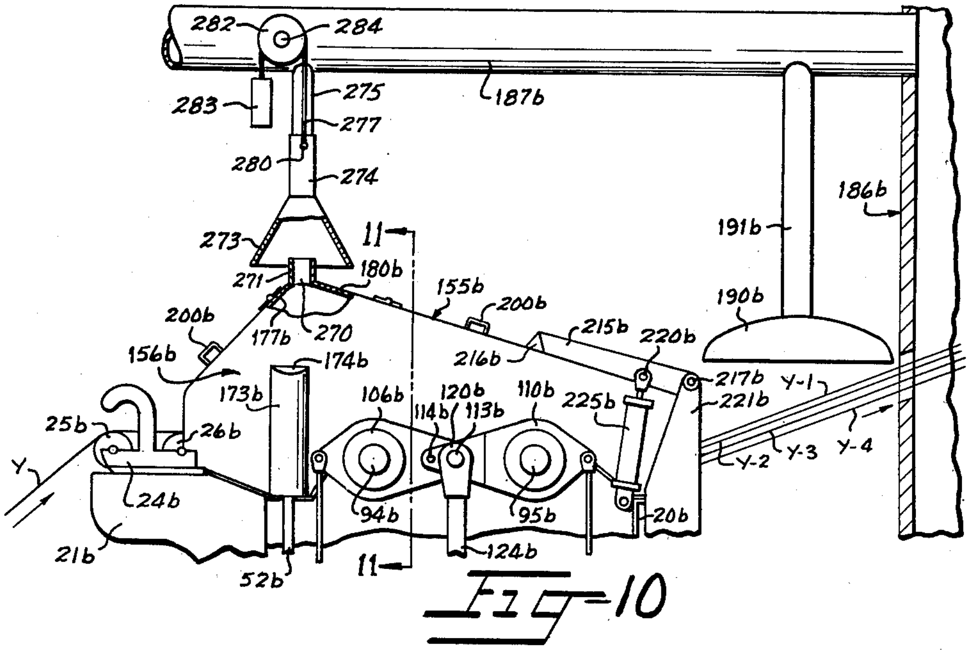
Figure 10 is a fragmentary elevation of a size box showing a third form of cover mounted thereon.
Figure 11:
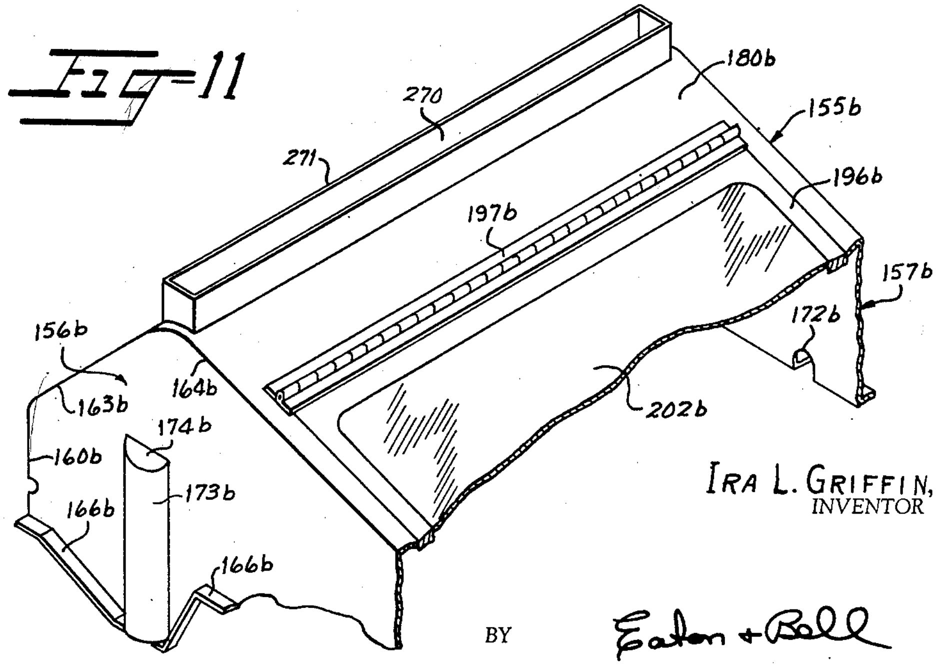
Figure 11 is an enlarged fragmentary isometric view of the cover shown in Figure 10 and looking substantially along the line 11—11 in Figure 10.

Figures 10 and 11 illustrate a third form of the invention showing a hood which is substantially the same as that shown in the original form of the invention (Figures 1 to 8, inclusive), this hood being shown in association with a portion of the size box only which is substantially the same as that shown in Figure 1.

The parts illustrated in Figures 10 and 11 which are identical to those shown in Figures 1 to 6, inclusive, shall bear the same reference characters as like parts shown in Figures 1 to 8, inclusive, and shall have the small letter "*b*" affixed thereto to avoid repetitive description.

There are some instances in which it may be desirable to exhaust a greater amount of the steam from the hood than it is possible to exhaust through the opening 185 shown in Figure 8 or the openings 185*a* shown in Figure 9. Therefore, the third form of hood 155*b* has a slot 270 extending longitudinally thereof through which the excess steam may escape, this slot being disposed at the juncture of the angularly disposed respective front and rear walls 177*b* and 180*b*. It is preferable that this opening 270 is rectangular in shape and a rectangular duct or flange 271 is provided which surrounds the opening 270 and thus prevents lint and other foreign material from falling through the opening 270 into the size box disposed therebelow.

In order to facilitate the opening or raising the front end of the hood 155*b*, and to also carry away the excess vapors escaping through the duct 271, there is provided a hood 273 which flares outwardly at its lower end and surmounts the duct 271. This hood 273 has a telescoping duct portion 274 extending upwardly therefrom which is mounted for vertical sliding movement on a pipe or duct 275 extending downwardly from and communicating with a pipe or duct 187*b* which extends to a drying apparatus 186*b* having suitable suction or blower means therein, not shown, to thus carry away the excess vapors rising from the duct 271. Now, when an operator desires to raise the front end of the hood 155*b*, he merely raises the hood 273 so the hood or cover 155*b* will clear the same when it is elevated. In order to facilitate the raising of the hood 273, the duct portion 274 thereof has the lower end of a cable 277 connected thereto, as at 280, and which extends upwardly and passes over an idler pulley 282 and then extends downwardly and has a suitable counterbalancing weight 288 fixed on the lower end thereof. The pulley 282 is rotatably mounted as at 284 on the duct 187*b*.

It is evident that the opening 270 would, in any instance, be only large enough to permit only a portion of the vapors rising from the fluid in the tank 31*b* to escape from the hood or cover 273 to thereby prevent the cooler air exteriorly of the tank 31*b* and the hood or cover 273 from entering the same.

It is thus seen that I have provided a cover or closed hood for size boxes and other yarn processing devises wherein the yarn is passed through a liquid starch or other heated liquid and which substantially confines the vapors rising from the heated liquid adjacent the squeeze rolls and the like through which the yarns are passed to thereby prevent the liquid starch or other material from congealing or condensing to a non-fluid state on the associated parts, such as the squeeze rolls, to thus produce a better quality of yarn than has heretofore been possible.

*Fourth form of the invention*

Figure 12:
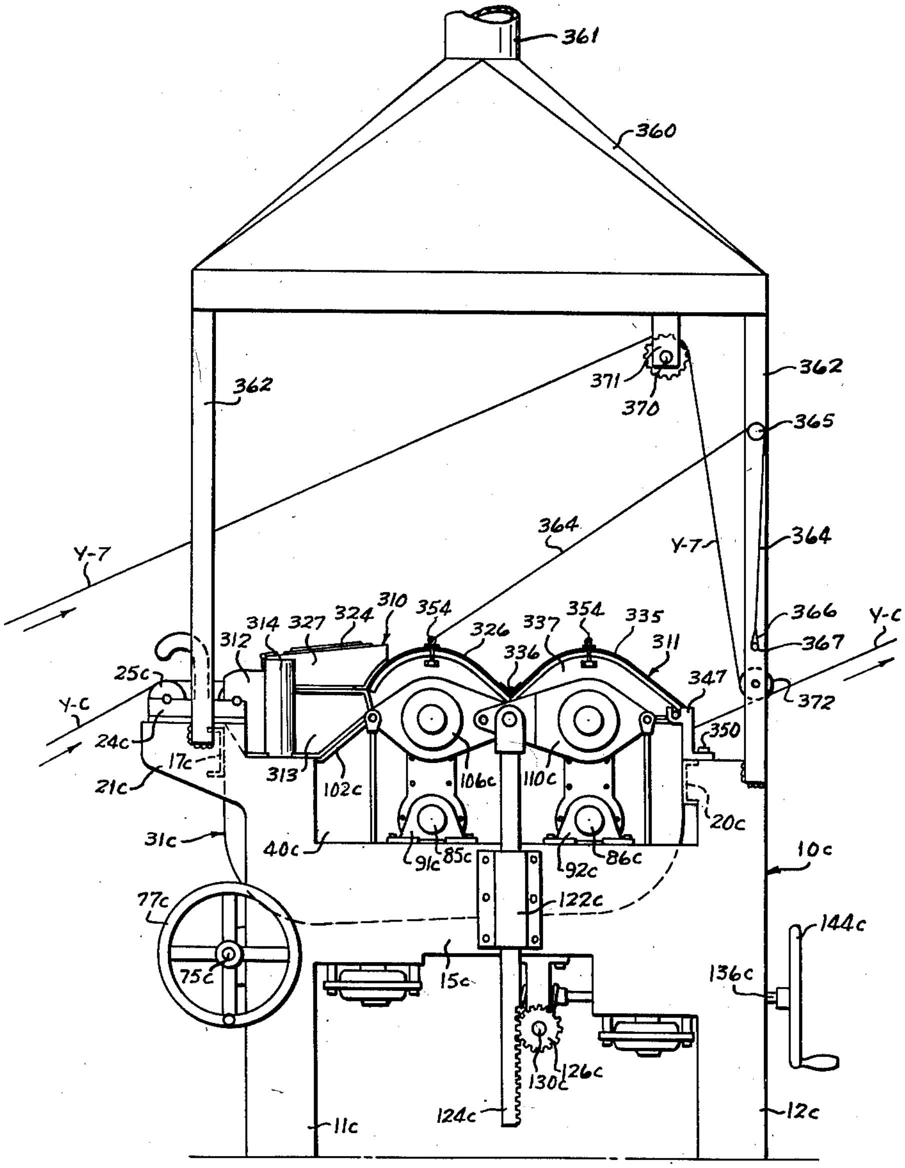
Figure 12 is an elevation of a size box similar to that shown in Figure 1 but being slightly longer and showing a fourth form of cover, which may be termed a composite cover, mounted thereon and also showing an auxiliary hood spaced above the size box and supported thereby.
Figures 13, 14, 15:
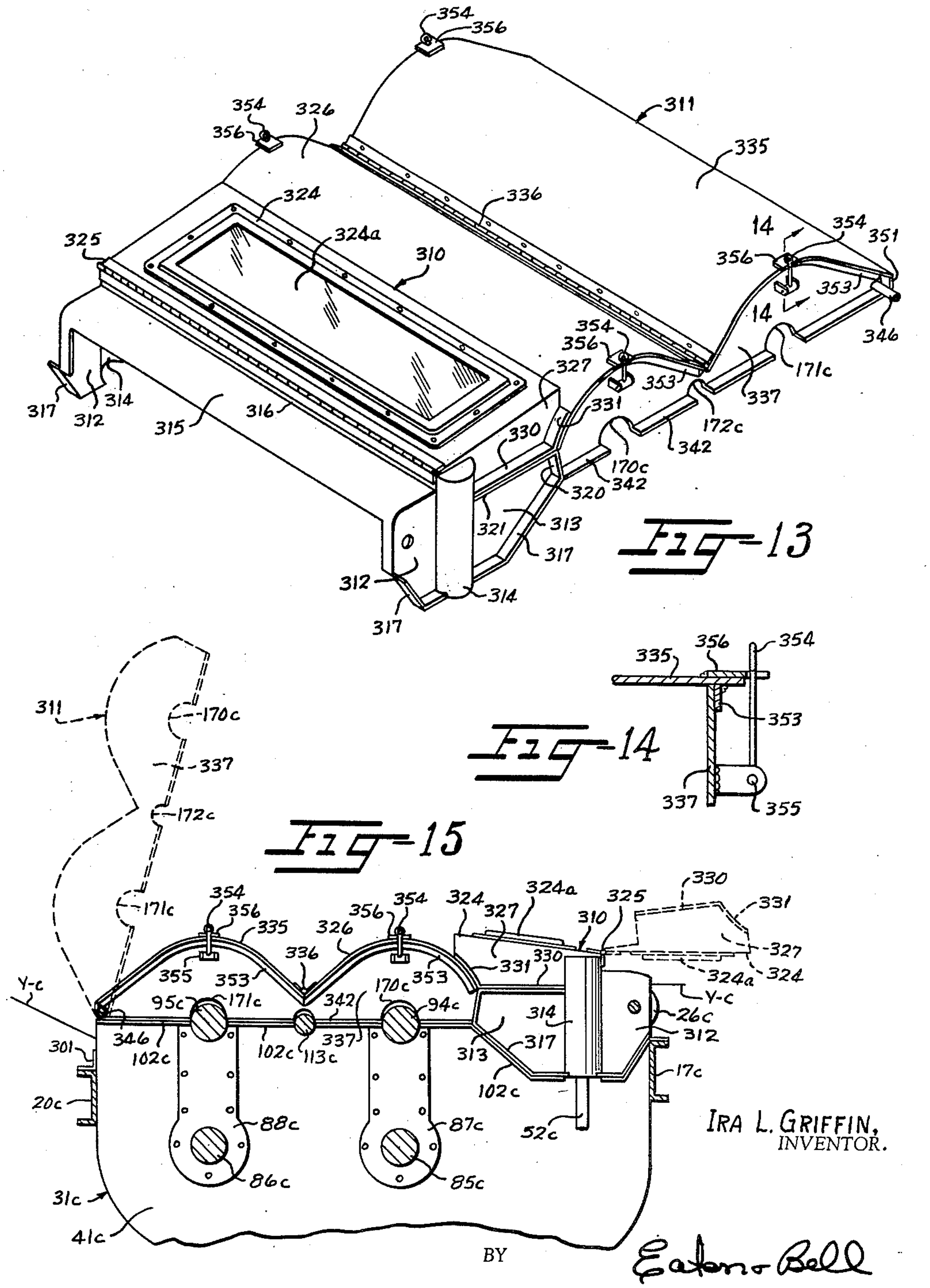
Figure 13 is an isometric view of the composite size box cover shown in Figure 12 but being disassociated from the size box.
Figure 14 is an enlarged fragmentary vertical sectional view taken along the line 14—14 in Figure 13.
Figure 15 is a fragmentary elevation of the upper portion of the size box looking at the opposite side of Figure 12 with parts of the size box being omitted for purposes of clarity and showing the composite size box cover mounted thereon and also showing the same in opened position represented by broken lines.
Figures 16, 17:
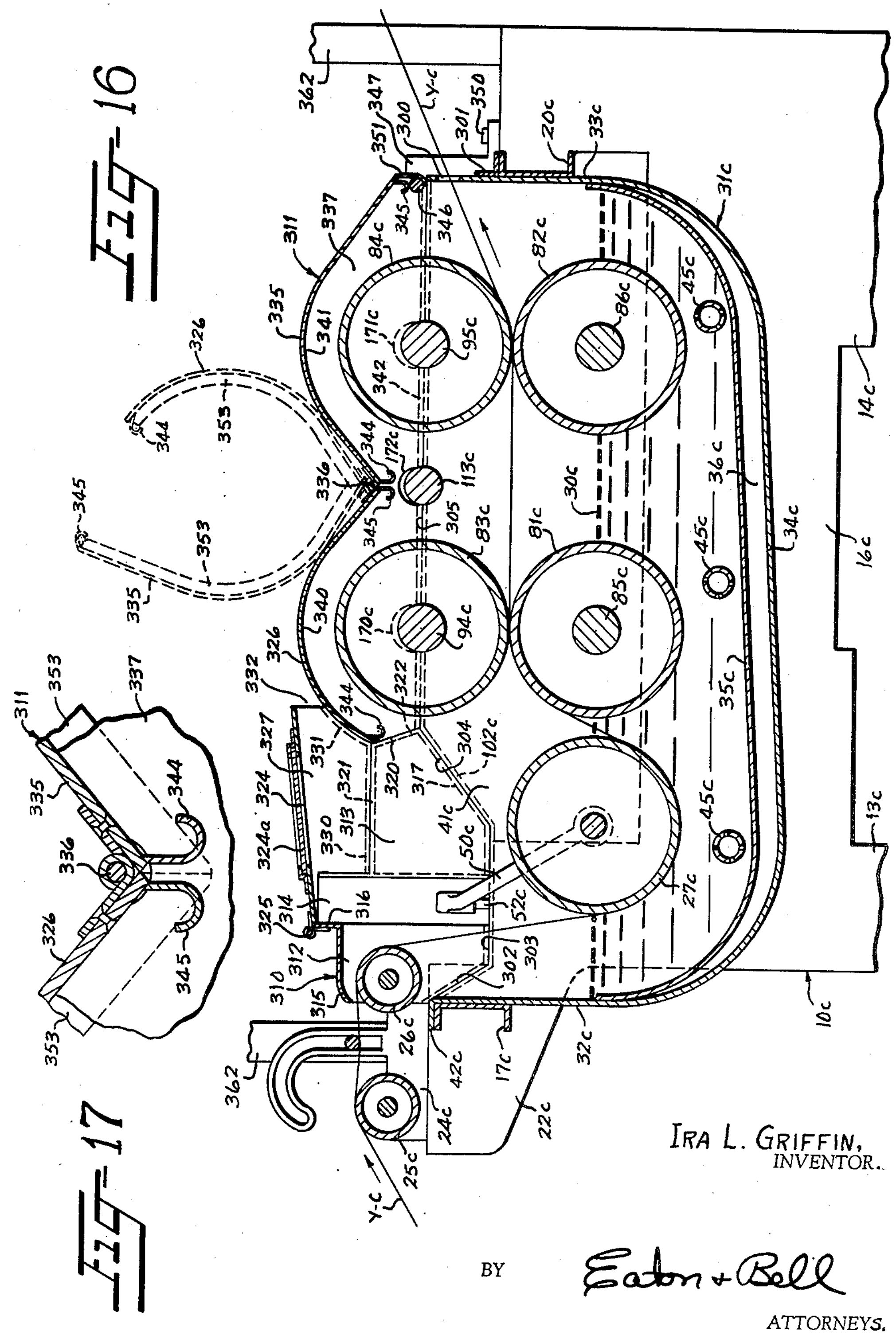
Figure 16 is an enlarged longitudinal vertical sectional view through the size box shown in Figure 12 but showing the size box somewhat schematically and showing in broken lines the manner in which individual doors on the squeeze roll cover assembly may be opened.
Figure 17 is an enlarged fragmentary detail of the upper central portion of the Figure 16.

Referring to Figures 12 to 17, inclusive, a fourth form of the invention is shown wherein a size box substantially of the type shown in Figure 1 is illustrated and on which another form of size box closure, hood or cover, which may be termed a composite size box cover, is mounted. The size box shown in Figures 12, 15 and 16 is substantially the same as the size box shown in Figure 1 and, therefore, in order to avoid repetitive description, those parts of the size box shown in Figures 12, 15 and 16 which are identical or substantially the same as the parts of the size box shown in the original form of the invention will bear the same reference characters with the letter "*c*" affixed thereto.

The size box shown in Figures 12 and 16 is somewhat longer than the size box shown in Figures 1, 7 and 8, this being necessary since the immersion roll 27*c* shown in Figure 16 is substantially larger than the immersion roll 27 shown in Figure 8. However, the immersion roll 27*c* may be of a smaller or larger relative diameter than illustrated, if desired. It will be noted that the size box shown in Figure 16 also differs from the size box shown in Figure 8 in that the arms or strap members 50*c*, in which opposed ends of the immersion rolls 27*c* are journaled, each extends upwardly and forwardly at an angle and is fixed to the upper end of the vertically movable support 52*c*. Only one of the supports 52*c* is shown in Figure 16, but these supports 52*c* are substantially the same as the vertically movable supports 52 and 53 in Figures 1 and 3 and may be controlled in an identical manner.

It will be noted in Figures 12 and 16 that the configuration of the upper edge of each of the side walls 40*c* and 41*c* of the tank 31*c* is different from that of the upper edge of each of the side walls 40 and 41 in Figures 7 and 8 for the specific purpose of accommodating and supporting the composite cover to be presently described. Also, the rear wall portion 33*c* of the tank 31*c* extends upwardly substantially beyond the upper surface of the rear transverse frame member 20*c* and has a longitudinally extending slot 300 therein through which the sheet of yarns Y–*c* passes after the excess solution has been squeezed therefrom by the squeeze rolls 82*c* and 84*c*.

In order to support the rear wall 33*c* of the tank 31*c*, a suitable frame member 301, in the form of an angle bar, is suitably secured, as by welding, to the outer surface of the rear wall 33*c* and rests upon the upper surface of the transverse frame member 20*c*. The lease bars or rods have been omitted from the showing in Figure 16 but may be positioned within the tank 31*c* or between the walls of the composite cover in substantially the same manner as the lease rods or bars 146 to 143, inclusive, shown in Figure 8, if so desired. When the yarns in the sheet Y–*c* are not too closely spaced, it is evident that the lease rods would not be required.

The upper edges of the side walls 40*c* and 41*c* of the tank 31*c* (Figures 12 and 16) are each provided with outwardly extending flanges 102*c* for supporting the composite hood to be presently described. However, the upper edge of each of the side walls 40*c* and 41*c* is provided with a downwardly and rearwardly sloping surface 302 extending from the juncture of the front wall 32*c* with the side walls 40*c* and 41*c* and each of these sloping surfaces 302 terminates at the lower end thereof in a relatively low horizontal surface 303 which extends rearwardly and terminates in an upwardly and rearwardly sloping surface 304.

This surface 304 extends upwardly at an angle preferably to a slightly higher elevation than the upper edge of the front wall 32*c* of the tank 31*c* and terminates at a horizontal surface 305 which extends rearwardly and terminates at the juncture of each of the side walls 40*c* and 41*c* with the rear wall 33*c* of the tank 31*c*. This surface 305 on each of the side walls 40*c* and 41*c* is disposed at substantially the same level as the upper edge of the rear wall 33c of the tank 31c.

The composite cover comprises a fixed front or immersion roll cover assembly broadly designated at 310 and a squeeze roll cover or rear hinged cover assembly broadly designated at 311. The front fixed or immersion roll cover assembly has wall portions 312 and 313 at each side thereof which are separated by a vertically disposed outwardly projecting elongated substantially semi-circular hollow portion 314, the upper and lower ends of which are open and the upper end of which is disposed in a slightly higher plane than the upper edges of the corresponding wall portions 312 and 313. The upper edge of the wall portion 313 is disposed in a substantially lower horizontal plane than the upper edge of the corresponding wall portion 312.

It will be noted that reduced opposed ends of the feed roll 26c loosely penetrate the corresponding wall portions 312 at opposed sides of the front cover assembly 310 of the composite cover and the distance between the upper edges of the wall portions 312 at opposed sides of the front cover assembly 310 is spanned by a top plate 315, the front edge of which preferably curves forwardly and downwardly to provide only enough space between the same and the upper surface of the roller 26c to permit the sheet of yarns Y–*c* to pass freely over the roller 26c.

It is evident that the outwardly bulging hollow portions 314 between the adjacent wall portions 312 and 313 of the front or immersion roll cover assembly 310 are provided to permit freedom of movement of the vertically movable supports 52c which support the arms 50c in which opposed ends of the immersion roll 27c are journaled.

The rear edge of the top plate member 315 is bent upwardly to form a vertical front wall 316 which extends between, and is suitably secured to, the corresponding outwardly bulging hollow portions 314 disposed between the side wall portions 312 and 313 of the front cover assembly 310. It will be noted that the lower edges of the side wall portions 312 and 313 are shaped to fit in the recess defined by the surfaces 302 to 304, inclusive, at the upper edge of each of the corresponding side walls 40c and 41c of the tank 31c. The lowermost edge of each of the side wall portions 312 and 313 is provided with flange portions 317 which rest upon the flange portions 102c which project outwardly from the edges 302 to 304, inclusive, of the corresponding side walls 40c and 41c of the tank 31c and to which the flange portions 317 may be suitably secured as by screws, rivets or welding, if desired.

Each of the side wall portions 313 of the front cover assembly 310 has an angularly disposed rear edge portion 320, the lowermost point of which is disposed at the juncture of the upwardly and forwardly sloping surface 304 and the horizontal surface 305 of each of the side walls 40c and 41c of the tank 31c. The rear edge of each of the side wall portions 313 of the front cover assembly 310 extends upwardly and forwardly at an angle from said juncture of the surfaces 304 and 305.

The upper horizontal edges of each of the rear side wall portions 313 and the rear vertical edge 320 thereof are provided with respective outwardly projecting flange portions 321 and 322. The front cover assembly 310 has a hinged cover or door 324 thereon which is hingedly connected, as at 325, to the front wall 316. It will be noted that the rear edge of the hinged cover 324 terminates in overlapping relation to a front hinged cover or door 326 of the squeeze roll cover assembly or rear cover assembly 311.

It will also be noted that the hinged door 324 of the front cover assembly 310 has a side wall 327 at each edge thereof which is disposed in the same vertical plane as the corresponding side wall portion 313 at each side of the front cover assembly 310. The lower edge of each of the side walls 327 of the hinged door 324 has a horizontal outwardly projecting flange 330 integral therewith which coincides with and rests upon the flange portion 321 at the upper edge of the corresponding side wall portion 313 of the front cover assembly 310.

The lower rear corner of each of the side walls 327 of the door or hinged cover 324 is cut away and is defined by an outwardly projecting flange 331 which normally rests against the upper surface of the curved hinged door 326 of the squeeze roll cover assembly 311. The rearmost edges of the side walls 327 of the hinged door 324 define opposed side walls of an opening 332 between the corresponding upper surface of the front hinged door 326 of the rear or squeeze roll cover assembly 311 and the lower surface of the hinged cover 324 of the front cover assembly 310 to thereby permit excess steam to escape from the tank 31c.

The flanges 330 and 331 on each of the side walls 327 of the hinged cover 324 merely rest upon the flange 321 of each of the side wall portions 313 of the front cover section or assembly 310 and the upper surface of the foremost portion of the curved front cover 326 of the squeeze roll cover assembly 311 and, therefore, the door 324 may be readily swung to open position to permit access to the immersion roll 27c or adjacent parts as is clearly shown in Figures 15 and 16.

It will be noted that the front hinged door 326 of the squeeze roll cover assembly 311 surmounts the front upper squeeze roll 83c in spaced relation thereto and the squeeze roll cover assembly 311 also has a rear hinged door 335 which surmounts the rear upper squeeze roll 84. The proximate edges of the front and rear hinged doors 326 and 335 are hingedly interconnected, as at 336 (Figures 16 and 17), and the opposed side edges of the hinged covers 326 and 335 extend outwardly beyond the upper edges of side walls 337 and normally rest thereupon. The upper edges of the side walls 337 are shaped to conform substantially to the curvature of the hinged doors 326 and 335 thus forming a pair of adjacent convex edge portions 340 and 341 on each of the side walls 337 of the rear or squeeze roll cover assembly 311.

The front edge of each of the side walls 337 of the squeeze roll cover assembly 311 extends at an angle coinciding with the angularly disposed edge 320 of the corresponding side wall of the front cover assembly 310 and, thus, the front edge of each of the side walls 337 rests against the flange 322 on the side wall 313 of the front cover assembly 310 when the squeeze roll cover assembly 311 is in closed position as shown in Figures 13, 15 and 16. The lower edge of each of the side walls 337 of the squeeze roll cover assembly 311 is substantially straight throughout its length and rests upon the flange portion 102c at the upper edge 305 of each of the side walls 40c and 41c of the tank 31c. It is evident that each of the side walls 337 of the squeeze roll cover assembly 311 is provided with an outwardly projecting flange 342 at the lower edge thereof and is also provided with substantially semi-circular openings 170c, 171c and 172c which are similar to and provided for the same purposes as the semi-circular openings 170, 171 and 172 shown in Figures 7 and 8. The flange 342 on the lower edge of each side wall 337 of the squeeze roll cover assembly 311 rests upon the corresponding portions of the flanges 102c on the upper edges of the side walls 40c and 41c when the squeeze roll cover assembly 311 is in a closed position.

In order to prevent the condensate which might collect on the lower surfaces of the hinged doors 326 and 335, due to condensation of the steam within the tank 31c, from falling upon the sheet of yarns Y–*c*, the front and rear edges of each of the doors 326 and 335 have respective substantially U-shaped troughs 344 and 345 suitably secured thereto and depending therefrom. Opposed ends of these troughs terminate short of the side walls 337 of the rear or squeeze roll cover assembly 311 so the condensate, which collects on the lower surfaces of the doors 326 and 335 and adheres thereto, will flow toward the lowermost point thereof to be collected by the corresponding troughs 344 and 345 and to thus be directed to one side or the other of the rear or squeeze roll cover assembly 311 and to then fall back into the tank 31c at a point beyond the opposed edges of the sheet or yarns Y–*c*.

The rear or squeeze roll cover assembly 311 is suitably hinged so the front end thereof may be swung upwardly and rearwardly to open position substantially as shown in broken lines in Figure 15. In this instance, the squeeze roll cover assembly 311 is hingedly supported by means of a hinge shaft 346 which extends through the side walls 337 at opposed sides of the squeeze roll cover assembly 311 and to which the side walls 337 are preferably secured by any suitable means such as welding.

It will be observed in Figures 12 and 16 that opposed ends of the shaft 346 are oscillatably mounted in suitable bearing stands 347 which extend downwardly and are suitably secured, as by screws 350, to the upper surfaces of the corresponding vertically disposed frame members 12*c* and 14*c* of the frame 10*c*. The rearmost edges of the side walls 337 of the cover assembly 311 have a rear wall member 351 suitably secured thereto, as by welding, and the lower surface of which preferably partially surrounds the shaft 346 to lend support thereto.

As heretofore stated, the doors 326 and 335 are hingedly interconnected at 336 and, obviously, these doors 326 and 335 cannot both assume an open position relative to the walls 337 simultaneously since the door 335 rests against the closed door 326 when in open position and the door 326 rests against the closed door 335 when the door 326 is in open position as shown in dotted lines in Figure 16. However, this permits access to either of the upper squeeze rolls 83*c* or 84*c* without the necessity of raising the entire squeeze roll cover assembly 311.

In order to insure that the steam within the tank 31*c* and the squeeze roll cover assembly 311 will not escape between the upper edges of the side walls 337 and the lower surfaces of the corresponding covers 326 and 335, it will be observed in Figures 12 to 17, inclusive, that each of the covers 326 and 335 is provided with a downwardly projecting flange 353 adjacent each side edge thereof and which preferably fits snugly against the outer surface of the corresponding side wall 337 of the squeeze roll cover assembly 311 when the hinged doors or covers 326 and 335 are in closed position as is most clearly shown in Figures 13 and 14.

Now, in order to insure that the hinged doors or covers 326 and 335 will remain in position against the upper edges of the side walls 337 of the squeeze roll cover assembly 311 when the squeeze roll cover assembly 311 is swung to the open or dotted line position shown in Figure 16, the hinged covers or doors 326 and 335 are locked in position against the upper edges of the side walls 337 by means of latches 354, there being one of these latches 354 pivotally mounted, as at 355, adjacent the uppermost point of each of the curved upper edge 340 and 341 of the side walls 337. The hinged covers or doors 326 and 335 are each provided with a bifurcated plate 356 which is suitably secured, as by welding, to opposed edges of each of the covers 326 and 335 and in which the latch 354 may be inserted by an operator when the doors 326 and 335 are in closed position to thereby lock the doors or hinged covers 326 and 335 against the upper edges 340 and 341, respectively, of the side walls 337.

If so desired, the hinged door 324 associated with the front or immersion roll cover assembly 310 may be provided with a transparent window 324*a* suitably mounted thereon to permit the operator to view the immersion roll 27*c* or the sheet of yarns Y–*c* without the necessity of opening the cover 324.

In order to dispose of excess steam which may escape from the tank 31*c* through the opening 332 between the hinged doors or covers 324 and 326 (Figure 16) there is spaced above the size box shown in Figure 12 a suitable hood 360 which is substantially rectangular at the bottom thereof, the walls of which converge upwardly and are connected to the lower end of a pipe 361 which may be connected to a suitable suction means, not shown, for disposing of the excess steam.

This hood 360 may be supported in any desired manner and it will be observed in Figure 12 that each corner thereof has a leg 362 extending downwardly therefrom which is suitably secured at its lower end, as by welding, to the corresponding corner of the frame 10*c*. In order to assist an operator in raising the squeeze roll cover assembly 311, there is shown in Figure 12 a cord or cable 364 which is connected at one end thereof to either one or both of the latches 354, which secure the cover 326 against the upper edges of the corresponding side walls 337.

The cord or cable 364 extends upwardly and rearwardly in Figure 12 and passes over a pulley 365 rotatably mounted on one of the legs 362 and then extends downwardly and has a loop 366 thereon which is normally positioned about a pin 367 also projecting from the leg 362 on which the pulley 365 is mounted. Thus, the operator may grasp the cable 364 and raise the front end of the rear or squeeze roll cover assembly 311. In so doing, the rear end of the cover or door 324 moves upwardly slightly to permit the front portion of the front cover or door 326, and the corresponding portions of the walls 337 of the squeeze roll cover assembly 311, to pass thereby after which the hinged door 324 of the front cover assembly 310 will fall to closed position. When the hinged squeeze roll cover assembly 311 has been moved upwardly the desired distance at the front end thereof, the cord or cable 364 may be suitably secured or tied to the pin 367 to maintain the cover assembly 311 in this open position.

When the operator desires to open the hinged doors 326 and 335 independently of each other, it is merely necessary to swing the corresponding latches 354 outwardly to release the doors 326 and 335 from the side walls 337 of the squeeze roll cover assembly 311 and to then swing the hinged covers or doors 326 and 335 to the opened position shown in dotted linees in Figure 16. It is evident that the door 326, upon being swung to open position, will also cause the door 324 to partially open therewith and to then fall to closed position as the door 326 moves past the same. Of course, if so desired, the door 324 may be swung to open position before the door 326 or the cover assembly 311 is opened.

In the event that two or more size boxes having covers thereon of the type shown in Figure 12 are to be arranged in tandem similar to the slashers A and B shown in Figure 9, it will be observed in Figure 12 that a sheet of yarns Y–7 may extend from a size box, not shown, disposed in advance of the size box shown in Figure 12 and pass upwardly above the size box shown in Figure 12 and over an idler roll 370 which is shown as being a fluted roll in Figure 12. This idler roll 370 is rotatably mounted in suitable bearing blocks 371 depending from opposed sides of the hood 360.

The sheet of yarns Y–7 then extends downwardly and passes beneath another idler roll 372 which is rotatably mounted at opposed ends thereof in the corresponding legs 362 at the rear of the size box shown in Figure 12. The sheet of yarns Y–*c* from the size box shown in Figure 12 passes upwardly and rearwardly at an angle from the tank 31*c* and passes immediately adjacent the lower surface of the idler roll 372 to thus cause the sheet of yarns Y–7 to blend into the sheet of yarns Y–*c* in their course to the drying apparatus, not shown.

If so desired, the idler roll 372 may be spaced above the path of travel of the sheet of yarns Y–*c* so that the sheet of yarns Y–7 will extend rearwardly from the rear legs 362 of the hood 360 in parallel spaced relation to the sheet of yarns Y–*c* in its course to the drying apparatus similar to the manner in which the sheets of yarns Y–5 and Y–6 are arranged as they extend from the tank 31*a* shown in Figure 9 associated with the size box B.

It is to be noted in Figures 12 to 16, inclusive, that the curvature of the covers 326 and 335 substantially conforms to the arcuity of the upper squeeze rolls and the covers are much closer to the upper squeeze rolls than in the other forms of the invention. This has an advantage over the other forms of the cover in that the rotation of the upper squeeze rolls will set up and generate currents of air and vapor which will wipe the lower surfaces of the covers 326 and 335 and thus prevent the formation of droplets of condensation thereon. Hence, the gutters 344 and 345 would not be necessary except during low speed of travel of the yarn in a slashing operation.

It is thus seen that I have provided a composite form of cover for a size box wherein portions of the cover may be swung to open position to permit access to predetermined areas within the tank 31*c* or the entire squeeze roll cover assembly 311 may be swung to open position and the door 324 of the immersion roll cover assembly 310 may be swung to open position to permit access to the entire tank 31*c*.

Referring to Figures 18 to 22, inclusive, a fifth form of the invention is shown wherein a size box substantially of the type shown in Figures 12 to 17, inclusive, is illustrated and showing another form of size box closure, hood or cover in association therewith. The size box shown in Figures 18 to 21, inclusive, is identical to that shown in Figures 12, 15 and 16 and, therefore, many of the parts are shown schematically and the lower portion of the size box has been omitted. Also, in order to avoid repetitive description, those parts of the size box shown in Figures 18, 19, 20 and 21 which are identical to the parts of the size box shown in Figures 12, 15 and 16 will bear the same reference characters with the letter "*d*" substituted for the letter "*c*."

The form of closure means illustrated in Figures 18 to 22, inclusive, differs primarily from the forms of the hood, contact closure or size box cover heretofore described in that it is particularly designed to be associated with the usual hood of the type which has heretofore been disposed in spaced relation above the size box. Of course, the hood last described has been modified to accommodate a vertically movable closure member or skirting as will be presently described.

Figure 20:
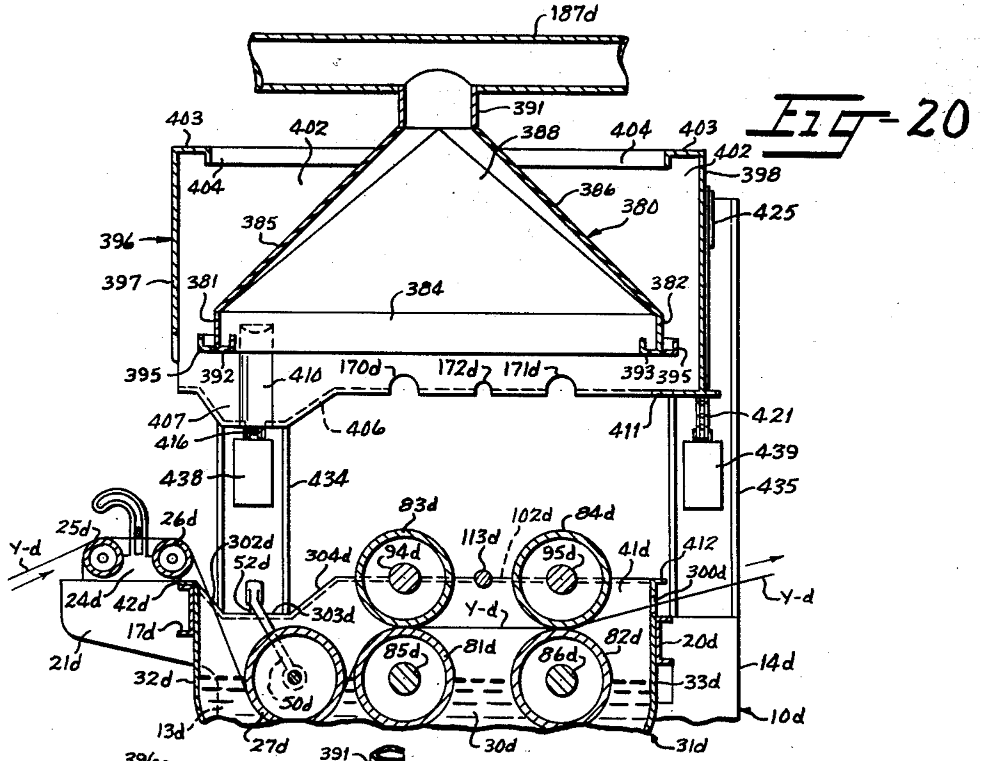
Figure 20 is a longitudinal vertical sectional view taken substantially along the line 20—20 in Figure 19 but showing the skirting of the contact closure or hood of the size box in an elevated or opened position.

In Figures 18 and 20, there is shown a horizontally disposed duct **187*d* which is similar to the duct 187 shown in Figure 1 and which is connected to a suitable suction or ventilating means, not shown. This duct 187*d* carries a stationary or fixed hood, broadly designated at 380, which is shown in Figure 20 as being spaced substantially above the tank 31*d* of the size box. The fixed or stationary hood 380 is substantially pyramidal in shape and includes respective front and rear vertically disposed walls 381 and 382 to opposed ends of which vertically disposed side walls 383 and 384 are suitably secured, as by welding. The upper edges of the walls 381 to 384, inclusive, are connected to the lower edges of upwardly converging or angularly disposed walls 385 to 388, respectively, the upper edges of which are connected to a pipe or duct 391. This pipe or duct 391 extends upwardly and is suitably secured to the pipe or duct 187*d*** for communication therewith.

Due to the vapors or steam rising from the size material **30*d* in the tank 31*d* of the size box shown in Figure 20, condensate collects on the lower surfaces of the angularly disposed walls 385 to 388, inclusive, of the fixed or stationary hood 380 and as a result of which, this condensate flows down the lower surfaces of the walls 385 to 388 and the corresponding walls 381 to 384**.

In order to prevent the condensate from falling onto the sheet of yarns Y–*d* as it passes through the size box, the lower edges of the front and rear walls 381 and 382 of the fixed or stationary hood 380 are provided with respective troughs or gutters 392 and 393 (Figures 20 and 22), opposed ends of which are spaced slightly from the corresponding side walls 383 and 384 of the fixed or stationary hood 380 to thereby direct the accumulation of condensate directed thereto from the walls 385 and 381 and 386 and 382 to points adjacent the side walls 383 and 384 of the fixed or stationary hood 380 and to thereby cause the condensate to fall back into the tank **31*d* at points adjacent the side walls 40*d* and 41*d* of the tank 31*d*** and to thereby prevent the condensate from falling back onto the sheet of yarns Y–*d* as it passes through the tank **31*d*. Each of the walls 381 to 384, inclusive, of the fixed or stationary hood 380 has a channel 395** on the lower edge thereof which extends outwardly and which is formed by an angle bar or a member which is L-shaped in cross-section and the purpose of which will be later described.

A vertically movable hood or skirting broadly designated at 396 is provided which comprises rear walls 397 and 398 and opposed side walls 401 and 402. It will be observed in Figure 20 that the upper edges of the walls 397, 398, 401 and 402 of the vertically movable hood or skirting 396 terminate in a like horizontal plane and each of the same has an inwardly directed portion 403 integral therewith which is provided with a downturned flange 404 to thus form an inverted channel which projects inwardly from each of the walls 397, 398, 401 and 402 of the vertically movable hood or skirting 396.

When the vertically movable hood 396 is in lowered position, as shown in Figures 18, 19 and 22, the downturned flanges 404 on the walls 397, 398, 401 and 402 of the vertically movable hood 396 are disposed within the channels 395 on the upper fixed or stationary hood 380 as is clearly shown in Figure 22. This causes substantially all of the vapors or steam rising from the size material **30*d* in the tank 31*d* to pass upwardly into the fixed or stationary hood 380 and thus through the pipe 391 and 187*d* rather than the steam or vapors escaping between the walls of the vertically movable hood or skirting 396 and the fixed or stationary hood 380. This also prevents the cooler air surrounding the walls of the hoods 396 and 380 from entering the same thereby preventing the cool air from cooling the squeeze rolls, the immersion roll and other elements disposed within the tank 31*d***.

It will be noted that the lower edge of each of the side walls 401 and 402 of the vertically movable hood or skirting 396 is of the same configuration as the upper edge of each of the side walls **40*d* and 41*d* of the tank 31*d* and is provided with an outwardly projecting flange 406 which rests upon the corresponding flange 102*d* of the side walls 40*d* and 41*d* of the tank 31*d* when the vertically movable hood 396 is in a lowered position. Of course, each of the side walls 401 and 402 of the vertically movable hood 396 has notches 170*d*, 171*d* and 172*d* in the lower edge thereof to accommodate the shafts 94*d*, 95*d* and 113*d* when the vertically movable hood or skirting 396** is in a lowered position.

As heretofore stated, the lower edges of each of the side walls 401 and 402 of the vertically movable hood or skirting 396 is of such configuration as to coincide with the upper edges of the respective walls **40*d* and 41*d* of the tank 31*d* thus forming a downwardly extending projection 407 on each of the side walls 401 and 402 of the vertically movable hood or skirting 396 and which fits into the corresponding recess defined by the edges 302*d*, 303*d* and 304*d* in each of the walls 40*d* and 41*d* of the tank 31*d*. Each of the downwardly extending projections 407 has an outwardly bulging wall portion 410 thereon for accommodating the corresponding vertically movable support 52*d* which supports the arms 50*d* in which opposed ends of the immersion roll 27*d*** are journaled.

The upper ends of these outwardly bulging wall portions 410 terminate substantially short of the upper edges of the corresponding side walls 401 and 402 and are preferably closed. The lower ends thereof are necessarily opened to accommodate the vertically movable supports **52*d*. Of course, these outwardly bulging wall portions 410 may terminate in the same horizontal plane as the upper edges of the corresponding side walls 401 and 402 if so desired. However, in this instance, the upper ends of these outwardly bulging wall portions 410 are spaced from the upper edges of the corresponding side walls 401 and 402 to accommodate the means for counterbalancing or permitting vertical movement of the vertically movable hood or skirting 396** as will be more fully described later in this context.

In this instance, the rear wall 398 of the vertically movable hood or skirting 396 is disposed rearwardly of the vertical plane of the rear wall **33*d* of the tank 31*d*. Therefore, the lower edge of the rear wall 398 has an inwardly projecting flange portion 411 thereon, the inner portion of which rests upon an outwardly projecting flange portion 412 on the upper edge of the rear wall 33*d* of the tank 31*d* when the vertically movable hood or skirting 396** is in closed position.

It will be noted that the lower edge of the front wall 397 of the vertically movable hood or skirting 396 terminates short of the corresponding lower edges of the side walls 401 and 402 to thus provide an opening between the lower edge of the front wall 396 and the upper edge of the front wall **32*d* of the tank 31*d* in which the feed roll 26*d*** may be disposed and through which the sheet of yarns Y–*d* extends in its course from the feed rools **25*d* and 26*d* to the immersion roll 27*d* when the vertically movable hood 396** is in a lowered position as shown in Figures 18 and 19.

In order to facilitate raising and lowering of the vertically movable hood or skirting 396, and to assist in guiding the same during vertical movement thereof, the inner lower ends of sprocket chains or belts 415 and 416 are connected to the upper ends of the outwardly bulging wall portions 410 on the side walls 401 and 402, respectively, for supporting the front portion of the vertically movable hood or skirting 396 when in a raised position. The rear portion of the vertically movable hood or skirting 396 is supported by sprocket chains or belts 420 and 421 which are connected at their inner lower ends to the outwardly projecting flanges 406 of the respective side walls 401 and 402 adjacent the rear end of the vertically movable hood or skirting 396.

Figure 21:
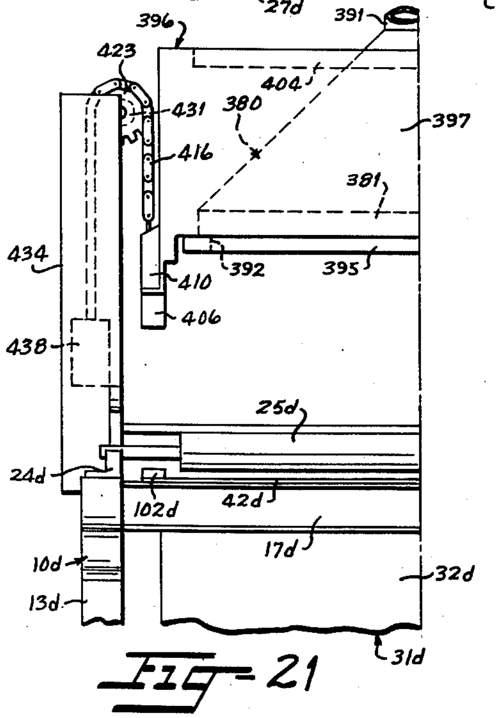
Figure 21 is a fragmentary elevation looking at the left-hand side of Figure 20 and showing only half of the structure since opposed halves of the hood and the size box are identical.

The sprocket chains 415, 416, 420 and 421 extend upwardly and partially encircle respective sprocket wheels 422 to 425, inclusive (Figures 18, 19 and 21). The sprocket wheels 422 and 424 are fixedly mounted on opposed ends of a horizontally disposed shaft 426. The sprocket wheels 423 and 425 are fixedly mounted on opposed ends of a longitudinally extending horizontally disposed shaft 427.

The shafts 426 and 427 are mounted in respective pairs of bearing blocks 430 and 431. The bearing blocks 430 are secured to the upper ends of auxiliary standards or bearing stands 432 and 433 which extend downwardly and are suitably secured, as by welding, to the upper ends of the respective upstanding frame members 11*d* and 12*d*. The bearing blocks 431 are suitably secured, as by welding, to the upper ends of vertically disposed standards or bearing stands 434 and 435 which also extend downwardly and are suitably secured as by welding, to the upper surfaces of the respective upstanding frame members 13*d* and 14*d* (Figure 20).

The standards 432 to 434, inclusive, are shown in the form of channel bars, the flanges of which serve as shields for respective counterbalancing weight members 436 to 439, inclusive, to the upper ends of which the free or outer ends of the respective sprocket chains 415, 416, 420 and 421 are suitably connected. These weight members 436 to 439, inclusive, are collectively of such weight as to substantially counterbalance the weight of the vertically movable hood or skirting 396 and it is thus seen that it is merely necessary for an operator to exert upward or downward pressure on the vertically movable hood or skirting 396 when he desires to open or close the same.

It is evident that other counterbalancing means, such as springs, may be employed in lieu of the sprocket chains and weight members described. Also, the skirting 396 may be raised and lowered by hydraulic of pneumatic means similar to that described for the original form of the invention shown in Figures 1 to 8, inclusive, if so desired.

It is thus seen that I have provided a contact closure for size boxes wherein the usual type of pyramidal shaped hood may be utilized with a skirting extending from the outer edges thereof downwardly to the upper edges of the corresponding walls of the tank 31*d* and I have further provided means whereby the skirting may be readily raised and lowered by the operator as desired.

While the hood for size boxes has been described with considerable detail with respect to certain particular forms of the invention, it is not desired to be limited to such details since many changes and modifications may well be made without departing from the spirit or scope of the invention in its broadest aspect.

In the drawings and specification, there has been set forth a preferred embodiment of the invention and although specific terms are employed, they are used in a generic and descriptive sense only and not for purposes of limitation, the scope of the invention being defined in the claims.

I claim:

1. An improvement in a size box of the character described having a tank provided with side walls and being adapted to contain a supply of heated size solution and said size box also having an immersion roll and a plurality of sets of upper and lower squeeze rolls arranged in series in said tank and past which a sheet of yarns is moved, the immersion roll and the lower squeeze rolls being at least partially submerged in the solution disposed in said tank, said size box also having means disposed exteriorly of said tank for rotatably supporting the squeeze rolls, and the upper edges of said side walls of the tank being disposed in the same horizontal plane as the axes of said upper squeeze rolls; said improvement comprising a size box cover hingedly supported on said size box and being provided with side walls, the lower edges of which normally rest upon the upper edges of the corresponding side walls of the tank, said cover also having front and rear walls provided with respective slots therein through which yarns pass in their course through the size box whereby the vapors rising from the heated size solution will remain substantially confined within the tank and the cover to thus prevent the size solution on the yarns and those parts of the size box disposed above the level of the size solution from changing to a non-fluid state within the confines of the tank and the cover due to evaporation.

2. In a structure according to claim 1, said size box also having means for rotatably supporting said immersion roll comprising a pair of arms disposed within said tank and in the lower ends of which oposed ends of the immersion roll are rotatably mounted and also including a pair of vertically movable supports mounted for vertical movement against the exterior surface of the side walls of said tank, and also including connecting means for connecting the upper ends of said arms to the upper ends of said vertically movable supports; each of said side walls of the tank having a recess in the upper edge thereof disposed at a point between the front end of the tank and the next adjacent upper squeeze roll to provide for vertical movement of said connecting means, a downwardly extending projection on each of the side walls of said cover coinciding with the recess in the upper edge of each of the side walls of said tank, an outwardly bulging hollow wall portion on the outer surface of each of said downwardly extending projections on the side walls of the cover and in which the upper portions of the vertically movable supports may be disposed thus permitting vertical movement of the vertically movable supports and the arms connected thereto while minimizing the escapement of the vapors from between the lower edges of the side walls of the cover and the upper edges of the side walls of the tank.

3. In a structure according to claim 2, said cover also having a pair of slanting upper walls thereon extending in diverging relation to each other from a point above the outwardly bulging wall portions on said side walls of the cover to thus provide a greater vertical displacement in the cover at said point than at the front and rear ends of said cover to accommodate the vertical movement of said vertically movable supports.

4. An improvement in a size box of the character described having a frame and having a tank provided with side walls and being adapted to contain a supply of heated size solution and said tank also having an immersion roll and at least one set of upper and lower squeeze rolls past which a sheet of yarns is moved and being at least partially submerged in the solution disposed in said tank, said size box also having means disposed exteriorly of said tank for rotatably supporting the squeeze rolls, and the upper edges of said side walls of the tank being disposed in the same horizontal plane as the axis of the said upper squeeze roll; said improvement comprising a size box cover hingedly supported on said frame and being provided with side walls, the lower edges of which normally rest upon the upper edges of the corresponding side walls of the tank, said cover also having front and rear walls provided with respective slots therein through which the sheet of yarns may pass in its course through the tank, whereby the vapors rising from the heated size solution will remain substantially confined within the tank and the cover to thus prevent cooler outside air from entering the tank and thereby preventing the size solution from congealing and condensing to a non-fluid state on the yarns and those parts of the size box disposed above the level of the size solution and within the confines of the tank and the cover, at least one ram pivotally connected at one end thereof to said frame and being pivotally connected at the other end thereof to said cover and manually controlled means for directing fluid under pressure to said ram for raising and lowering said cover relative to the tank.

5. An improvement in a size box of the character described having a frame and tank supported by said frame and adapted to contain a supply of heated size solution, an immersion roll and at least one set of upper and lower squeeze rolls within said tank and wherein a sheet of yarns is adapted to be passed beneath the immersion roll and between the set of upper and lower squeeze rolls, successively, in a sizing operation and said tank having side walls and front and rear end walls thereon and said squeeze rolls having shaft portions thereon extending through the side walls of said tank and being rotatably mounted on said frame exteriorly of the tank, said size box also having a pair of upwardly extending arms in which opposed ends of the immersion roll are journaled and a pair of vertically movable supports to which the upper ends of said arms are connected and said supports being mounted for vertical movement exteriorly of the side walls of said tank; said improvement comprising a cover for the tank having generally triangularly-shaped side walls and having upper walls connected at opposed edges thereof to the upper edges of said side walls of the cover to cause the upper walls to extend downwardly at angles in diverging relation to each other, and the proximate edges of the side walls of the cover and the tank being provided with coinciding notches to accommodate the upper and lower halves of the shaft portions of the upper squeeze roll in said set whereby said cover rests in contact with the upper edges of the side walls of the tank to substantially confine the vapors rising from the heated size solution in the tank within the cover and the tank to thereby exclude cooler outside air from the interior of the tank and to maintain the parts confined within the cover and the tank, above the level of the size solution, at a relatively high temperature to prevent the moisture in the size solution on the yarn and the adjacent parts of the size box from congealing.

6. In a structure according to claim 5, at least one of the upper diverging walls of said cover having a hinged transparent door thereon to permit access to the confines of a particular area in said cover and to provide for visual reference to said area without opening said door.

7. In a structure according to claim 6, said upper walls of the cover being made from relatively thin sheets of material and the said door being hingedly mounted in a portion of said upper wall above the set of squeeze rolls, a curved moisture deflecting member mounted between the side walls of said cover and surmounting the upper squeeze roll in the set of upper and lower squeeze rolls disposed beneath said door, and troughs extending along opposed edges of the curved moisture deflecting member whereby, upon condensate collecting on the lower surface of said door, the drops of moisture thus formed will fall upon the moisture deflecting member and flow down the curved surface of the same into said troughs to thus be conveyed to points adjacent the inner surfaces of the side walls of said cover and said tank to prevent the drops of moisture from falling upon the corresponding squeeze roll and the sheet of yarns passing through the size box.

8. Covers for size boxes for applying size solution to a first and a second sheets of yarns wherein at least a first and a second size boxes are arranged in tandem, each of said size boxes having a frame and a tank adapted to contain a supply of heated size solution and being supported by said frame and an immersion roll and successively arranged sets of driven upper and lower squeeze rolls disposed within each of the tanks and each of the tanks having front, rear and side walls and having at least one feed roll disposed at the front end of each of said size boxes above the horizontal plane of the upper edges of the walls of each of the tanks and over which the corresponding sheet of yarns is adapted to pass in its course beneath the immersion roll and between the sets of upper and lower squeeze rolls, said immersion roll and the lower squeeze rolls in each tank being at least partially submerged in said solution, the upper edges of the side walls of each of the tanks terminating in substantially the same horizontal plane as the axes of the upper squeeze rolls, said squeeze rolls each having shaft portions projecting therefrom outwardly beyond the side walls of the corresponding tanks; each of said covers comprising side, top and front walls, the lower edges of the side walls of each of said covers being of substantially the same configuration as the upper edges of the corresponding side walls of the tanks and on which the lower edges of the side walls of said covers normally rest, the lower edges of the side walls of said covers being provided with notches therein for accommodating the shaft portions of said upper squeeze rolls, each of said front walls of said covers having a slot therein partially closed by said feed roll and through which the corresponding sheet of yarns passes, each size box being provided with an enclosing rear wall thereon extending above the horizontal plane of the tank and being provided with a slot therein through which the corresponding sheet of yarns passes as it leaves the corresponding size box, the second size box being disposed subsequent to the first size box, the front wall of the second size box being provided with a slot therein disposed above the first-named slot in said last-named front wall and through which the first sheet of yarns from the first size box is adapted to pass, a first idler roll carried by the side walls of the tank of the second size box and being spaced substantially above the horizontal plane of the upper squeeze rolls in the second size box and within the confines of the cover on the second size box, a second idler roll disposed in the opening in the rear wall of said second size box and beneath which the first sheet of yarns from the first size box passes after passing over said first idler roll in the second size box to thus cause the first sheet of yarns from the first size box to pass above the squeeze rolls in the second size box and to subsequently leave the second size box in parallel relation to the second sheet of yarns from the second size box.

9. An improvement in a size box of the character described having a frame, a tank supported by said frame and adapted to contain a supply of heated size solution, an immersion roll and sets of upper and lower squeeze rolls arranged in series within said tank and wherein a sheet of yarns is adapted to be passed beneath the immersion roll and between the sets of upper and lower squeeze rolls, successively, in a sizing operation and said tank having side walls and front and rear walls thereon and said squeeze rolls having shaft portions thereon extending through the side walls of said tank and being rotatably mounted on said frame exteriorly of the tank, a pair of upwardly extending arms in which opposed ends of the immersion roll are journaled and a pair of vertically movable supports to which the upper ends of said arms are connected and said supports being mounted for vertical movement exteriorly of the side walls of said tank; said improvement comprising a cover for the tank having generally triangularly-shaped side walls and having upper walls connected at opposed edges thereof to the upper edges of said side walls of the cover to cause the upper walls to extend downwardly at angles in diverging relation to each other, the proximate edges of the side walls of the cover and the tank being provided with coinciding notches to accommodate the upper and lower halves of the shaft portions of the upper squeeze rolls in each of said sets whereby said cover rests in contact with the upper edges of the side walls of the tank to substantially confine the vapors rising from the heated size solution in the tank within the cover and the tank to exclude cooler outside air from the interior of the tank and to thereby maintain the parts confined within the cover and the tank, above the level of the size solution, at a relatively high temperature to prevent the moisture in the size solution on the yarn and the adjacent parts of the size box from evaporating, and said upper diverging walls of the cover having an opening at their juncture extending between the proximate surfaces of the side walls of said cover to permit excess vapors rising from the heated size solution in the size box to escape through said opening.

10. In a structure according to claim 9, a flange projecting upwardly from adjacent the walls of said opening in the upper diverging wall of said cover to thereby prevent dust and the like from entering said opening.

11. A composite cover for a size box having a frame, a tank mounted on said frame and having front, rear and side walls and within which a heated size solution is disposed, at least two sets of upper and lower squeeze rolls arranged in series within said tank and between which a sheet of yarns is adapted to pass and having shaft portions thereon projecting through the side walls of said tank, said size box also having an immersion roll disposed within the tank beneath which said sheet of yarns passes and said size box also having upwardly projecting arms in which opposed ends of the immersion roll are journaled and also having vertically movable supports mounted for vertical movement adjacent the exterior surfaces of the side walls of the tank and having means for connecting the upper ends of said arms to the upper ends of said supports, and said immersion roll and said lower squeeze rolls being at least partially submerged in said solution, the upper edges of the side walls of said tank each being provided with a substantially horizontal surface disposed in substantially the same horizontal plane as the axes of the upper squeeze rolls and also being provided with spaced downwardly converging edge portions disposed forwardly of said squeeze rolls and an intervening horizontal portion joining said converging edge portions defining a notch disposed above the horizontal plane of the immersion roll; said composite cover comprising a front cover assembly and a rear cover assembly, said front cover assembly including spaced front and rear side walls whose lower edges conform to the converging upper edge portions and the intervening horizontal edge portions of the side walls of the tank, an outwardly bulging side wall portion connecting each of the spaced front and rear side walls of the front cover assembly, the upper edge of the outwardly bulging portion being disposed at a higher level than the upper edges of the corresponding front and rear side walls of the front cover assembly, said vertically movable supports being partially disposed in the outwardly bulging wall portions, a top wall fixed to and spanning the distance between the upper edges of the front side walls of the front cover assemby, a first door hingedly mounted on the front cover assembly and having a top wall and side walls and the latter side walls normally resting upon the upper edges of the rear side walls of the front cover assembly, a squeeze roll cover assembly including a pair of side walls normally resting upon the corresponding upper horizontal surfaces of the side walls of the tank, a front and a rear curved doors hingedly connected at their juncture and normally resting upon the upper edges of the side walls of the squeeze roll cover assembly, releasable locking means for locking the curved doors of the squeeze roll cover assembly in engagement with the corresponding side walls, hinge means hingedly connecting the rearmost ends of said side walls of said squeeze roll cover assembly to said frame, and the first door on the front cover assembly projecting over and normally resting upon the front curved door of the squeeze roll cover assembly, whereby the curved doors on the squeeze roll cover assembly may be released from said locking means and swung to open position individually and the door of the front cover assembly may also be swung to open position to permit access to predetermined areas of the interior of the tank and, also, whereby the entire squeeze roll cover assembly may be swung to open position to permit access to a substantially greater area of the interior of said tank and whereby said cover substantially confines vapors rising from said solution within the tank to prevent said solution from congealing and condensing to a non-fluid state on the squeeze rolls and the sheet of yarns.

12. In a structure according to claim 11, each of said curved doors of the squeeze roll cover assembly surmounting a corresponding upper squeeze roll and being provided with troughs projecting downwardly from the front and rear edges thereof for collecting condensate which may cling to the lower surfaces of the curved doors of the squeeze roll cover assembly to thereby direct the condensate to one side of the path of travel of the sheet of yarns and to either side of the corresponding squeeze rolls to prevent the condensate from collecting on the squeeze rolls and the sheet of yarns.

13. In a structure according to claim 12, the top wall of said first door being spaced above the front curved door on the squeeze roll cover assembly to thereby provide an opening therebetween through which excess vapors may escape from said tank and said composite cover.

14. In a size box having an open-topped tank adapted to contain a supply of heated size solution and being provided with means for guiding yarns therethrough for treating said yarns with said size solution and also having means for squeezing excess size solution from said yarns and also having a horizontally disposed air discharge pipe spaced above the tank, a fixed hood deepnding from said air discharge pipe and communicating therewith, and a skirting extending from the bottom of said fixed hood to the top of said tank to thereby exclude air exteriorly of the tank from within the tank to prevent said size solution from congealing and condensing to a non-fluid state on the guiding means and squeezing means.

15. In a size box having an open-topped tank provided with walls and being adapted to contain a supply of heated size solution and said tank having means therein for guiding yarns therethrough for treating said yarns with said size solution and also having means for squeezing excess size solution from said yarns; a fixed hood spaced substantially above the tank and a vertically movable skirting having walls whose upper edges are disposed in close proximity to the fixed hood and whose lower edges rest upon the walls of the tank when the vertically movable skirting is in a closed position whereby said vertically movable skirting and said hood will assist in confining the vapors from the heated size solution within the tank while also assisting in excluding air of a temperature below that of the temperature within the skirting and the fixed hood and the tank from the skirting and the fixed hood and the tank to prevent said size solution from congealing and condensing to a non-fluid state on the guiding means and squeezing means.

16. In a structure according to claim 15, an upwardly facing channel on the periphery of the lower portion of said fixed hood, a downwardly facing channel adjacent the upper edges of the walls of said vertically movable skirting, said downwardly facing channel on the skirting defining a downwardly projecting flange on the skirting and said downwardly directed flange being so arranged relative to the upwardly facing channel on the lower portion of said fixed hood that the downwardly facing flange is disposed within the confines of said upwardly facing channel on the fixed hood when the vertically movable skirting is in a lowered or closed position.

17. In a size box having an open-topped tank adapted to contain a supply of heated size solution and being provided with means for guiding yarns therethrough for treating said yarns with said size solution and also having means for squeezing excess size solution from said yarns and also having a horizontally disposed air discharge pipe spaced above the tank, a fixed hood depending from said air discharge pipe and communicating therewith, a skirting extending from the bottom of said fixed hood to the top of said tank to thereby exclude air exteriorly of the tank from within the tank to prevent said size solution from congealing and condensing to a non-fluid state on the guiding means and squeezing means and counterbalancing means for supporting said vertically movable skirting to enable an operator to easily raise and lower the vertically movable skirting relative to the tank and the fixed hood spaced thereabove.

18. In a size box for applying a heated size solution to a sheet of yarns, an open topped tank for containing said size solution, a cover fitted onto the open top of said tank and having openings in opposed ends thereof through which said sheet of yarns may pass as it is passed through the size solution in said tank whereby said cover substantially excludes outside air of a lower temperature from the interior thereof to assist in maintaining a desired temperature and relative humidity in the tank and to prevent the congealing and condensing of the size solution in the tank to a non-fluid state, the top of the cover having an opening therein, an inverted funnel disposed above the opening and in spaced relation thereto, and suction means connected to said inverted funnel.

19. In a slasher size box for applying a heated size solution to a sheet of yarns having an open topped tank for containing said size solution and an immersion roll and at least one set of squeeze rolls disposed partially within said tank; a cover fitted onto the open top of said tank and enclosing said rolls, the lower edges of the cover normally being closely adjacent the tank to substantially exclude outside air of a lower temperature from the interior of the tank and to assist in maintaining a desired temperature and relative humidity in the tank and to prevent the congealing and condensing of the size solution in the tank and on the immersion and squeeze rolls within the tank, means for opening the cover, and means permitting ingress and egress of the yarns into and out of the tank while the cover is in closed position.

20. An improvement in a size box of the character described having a tank provided with side walls and being adapted to contain a supply of heated size solution and said size box also having an immersion roll and at least one set of upper and lower squeeze rolls arranged in said tank and past which a sheet of yarns is moved, the immersion roll and the lower squeeze roll being at least partially submerged in the solution disposed in said tank, said size box also having means disposed exteriorly of said tank for rotatably supporting the squeeze rolls; said improvement comprising a size box cover hingedly supported on said size box and being provided with side walls, the lower edges of which normally rest upon the upper edges of the corresponding side walls of the tank, said cover also having front and rear walls provided with respective ingress and egress means through which the yarns may pass in their course through the size box whereby the vapors rising from the heated size solution will remain substantially confined within the tank and the cover to thus prevent the size solution on the yarns and those parts of the size box disposed above the level of the size solution from changing to a non-fluid state within the confines of the tank and the cover due to evaporation.

21. An improvement in a size box of the character described having a frame and having a tank provided with side walls and being adapted to contain a supply of heated size solution and said tank also having an immersion roll and at least one set of upper and lower squeeze rolls past which a sheet of yarns is moved, said size box also having means disposed exteriorly of said tank for rotatably supporting the squeeze rolls; said improvement comprising a size box cover hingedly supported on said frame and being provided with side walls, the lower edges of which normally rest upon the upper edges of the corresponding side walls of the tank, said cover also having front and rear walls provided with ingress and egress means through which the sheet of yarns may pass in its course through the tank, whereby the vapors rising from the heated size solution will remain substantially confined within the tank and the cover to thus prevent cooler outside air from entering the tank and thereby preventing the size solution from congealing and condensing to a non-fluid state on the yarns and those parts of the size box disposed above the level of the size solution and within the confines of the tank and the cover, and means for raising and lowering said cover relative to the tank.

22. In a slasher size box for applying a heated size solution to a sheet of yarns, an open-topped tank for containing said size solution and having an immersion roll and squeeze rolls disposed partially therein, a movable cover fitted onto the open top of said tank and enclosing the immersion and squeeze rolls, whereby said cover substantially excludes outside air of a lower temperature from the interior thereof to assist in maintaining a desired temperature and relative humidity in the tank and to prevent the congealing and condensing of the size solution in the tank to a non-fluid state, and means permitting ingress and egress of the yarns into and out of the tank.

References Cited in the file of this patent

UNITED STATES PATENTS

| | | |
|---|---|---|
| 934,034 | Boyeux | Sept. 14, 1909 |
| 1,128,193 | Smith | Feb. 9, 1915 |
| 1,153,245 | Nivling | Sept. 14, 1915 |
| 1,801,065 | Ashworth | Apr. 14, 1931 |
| 1,841,329 | Goldner | Jan. 12, 1932 |
| 1,920,870 | Lancaster | Aug. 1, 1933 |
| 2,022,854 | Greenwood | Dec. 3, 1935 |
| 2,120,409 | Hill | June 14, 1938 |
| 2,216,006 | Grier | Sept. 23, 1939 |
| 2,564,725 | Rusca | Aug. 21, 1951 |
| 2,565,407 | Still | Aug. 21, 1951 |
| 2,570,830 | McCarthy et al. | Oct. 9, 1951 |
| 2,585,948 | Litzler | Feb. 19, 1952 |
| 2,638,765 | Quinn | May 19, 1953 |

FOREIGN PATENTS

| | | |
|---|---|---|
| 311,137 | Great Britain | May 9, 1929 |
| 11,158 | Great Britain | of 1903 |
| 750,640 | France | May 29, 1933 |